(12) United States Patent
Kung et al.

(10) Patent No.: US 11,612,111 B1
(45) Date of Patent: Mar. 28, 2023

(54) NESTING CONTAINER FOR VERTICAL FARM

(71) Applicant: Just Greens, LLC, Newark, NJ (US)

(72) Inventors: Elaine Kung, Brooklyn, NY (US); Nicholas Philip Robert Barclay, New York, NY (US); John Neill, Tappan, NY (US); John James Tarter, Jersey City, NJ (US); Justin Robert Zabilansky, Brooklyn, NY (US)

(73) Assignee: AeroFarms, Inc., Newark, NJ (US)

( * ) Notice: Subject to any disclaimer, the term of this patent is extended or adjusted under 35 U.S.C. 154(b) by 70 days.

(21) Appl. No.: 16/774,968

(22) Filed: Jan. 28, 2020

Related U.S. Application Data

(60) Provisional application No. 62/800,119, filed on Feb. 1, 2019.

(51) Int. Cl.
*A01G 9/02* (2018.01)
*A01G 31/06* (2006.01)
(Continued)

(52) U.S. Cl.
CPC .............. *A01G 9/022* (2013.01); *A01G 31/04* (2013.01); *A01G 31/06* (2013.01); *A01G 2025/006* (2013.01)

(58) Field of Classification Search
CPC ........ A01G 9/022; A01G 31/06; A01G 9/045; A01G 9/0297
(Continued)

(56) References Cited

U.S. PATENT DOCUMENTS 3,965,614 A * 6/1976 Kienholz ............... A01G 31/06
47/14
5,440,836 A * 8/1995 Lee ........................ A01G 31/06
47/60
(Continued)

FOREIGN PATENT DOCUMENTS

EP 3145825 B1 11/2019
FR 3000872 A1 * 7/2014 ............ E04F 13/083
(Continued)

OTHER PUBLICATIONS

Bootstrap Farmer Product Literature, 1010 Seed Tray—Extra Strength Seedling Trays (No Drain Holes)—10"x 10", 10 Pack for Growing Microgreens, Wheatgrass Seeds, Hydroponic Germination, Fodder System 1020 Starter. https://www.amazon.com/1010-Seed-Tray-Microgreens-Germination/dp/B074LN123J/ref=pd_bxqy_86_img_2/132-3664402-6669950?_encoding=UTF8&pd_rd_i=B074LN123J&pd_rd_r=28b12238-d3a4-4d15-8a40-2d167fe20406&pd_rd_w=7qJoq&pd_rd_wg=DlswR&pf_rd_p=09627863-9889-4290-b90a-5e9f86682449&pf_rd_r=V5BFVNW99QH0W7JF5JGO&psc=1&refRID=V5BFVNW99QH0W7JF5JGQ.
(Continued)

*Primary Examiner* — Joshua D Huson
*Assistant Examiner* — Katherine Anne Kloecker
(74) *Attorney, Agent, or Firm* — John Pillion; McCarter & English, LLP

(57) ABSTRACT

The disclosed container defines (i) an "interior" configured to interact with a fluid and/or developing plants, and (ii) an "exterior" that at least partially defines a perimeter around the interior. The disclosed container may further include stacking features/elements which allow one container to be stacked/nested one upon the other. The disclosed container may further include features/elements which enable one container to be connected adjacent to the other. The disclosed container may further include (i) features/elements
(Continued)

for delivering fluid, (ii) features/elements for draining fluid, and (iii) features/elements for supporting developing plants that are conducive to their growing within the disclosed container.

16 Claims, 21 Drawing Sheets

(51) Int. Cl.
*A01G 31/04* (2006.01)
*A01G 25/00* (2006.01)

(58) Field of Classification Search
USPC .............................................................. 47/75
See application file for complete search history.

(56) References Cited

U.S. PATENT DOCUMENTS

| | | | |
|---|---|---|---|
| 6,508,033 B2 | 1/2003 | Hessel et al. | |
| 7,832,146 B2 * | 11/2010 | Gordon | A01G 27/005 47/79 |
| 8,505,238 B2 | 8/2013 | Luebbers et al. | |
| 8,533,992 B2 | 9/2013 | Harwood | |
| 8,782,948 B2 | 7/2014 | Harwood et al. | |
| 8,833,594 B2 * | 9/2014 | Stahl | A47F 3/14 220/571 |
| 9,055,718 B2 * | 6/2015 | Geerligs | A01G 29/00 |
| 9,345,207 B2 | 5/2016 | Juncal et al. | |
| 9,474,217 B2 | 10/2016 | Anderson et al. | |
| 9,974,243 B2 | 5/2018 | Martin | |
| 9,974,252 B2 | 5/2018 | Aykroyd et al. | |
| 10,182,537 B1 | 1/2019 | Buelow | |
| 10,542,685 B2 | 1/2020 | Buelow | |
| 2007/0180766 A1 * | 8/2007 | Wilkes | A01G 9/023 47/83 |
| 2008/0276530 A1 * | 11/2008 | Trabka | A01G 9/028 47/86 |
| 2009/0126269 A1 | 5/2009 | Wilson et al. | |
| 2012/0085026 A1 | 4/2012 | Morris | |
| 2013/0019527 A1 | 1/2013 | Howe-Sylvain | |
| 2014/0165467 A1 * | 6/2014 | DeYoung | A01G 9/045 47/87 |
| 2015/0082697 A1 * | 3/2015 | Cantolino | A01G 9/02 47/79 |
| 2015/0373935 A1 | 12/2015 | Anderson et al. | |
| 2017/0027110 A1 | 2/2017 | Ito et al. | |
| 2017/0188527 A1 * | 7/2017 | Gordon | A01G 27/02 |
| 2017/0188528 A1 * | 7/2017 | Gordon | A01G 27/005 |
| 2017/0339846 A1 | 11/2017 | Lawrence et al. | |
| 2017/0354096 A1 * | 12/2017 | Xing | A01G 27/005 |
| 2018/0235156 A1 | 8/2018 | Blair et al. | |
| 2018/0255720 A1 | 9/2018 | Anderson et al. | |
| 2019/0082620 A1 | 3/2019 | Griffin | |
| 2019/0092567 A1 | 3/2019 | Lawrence et al. | |
| 2019/0133062 A1 | 5/2019 | Joseph et al. | |
| 2019/0159415 A1 | 5/2019 | Bertram et al. | |
| 2019/0261577 A1 | 8/2019 | Burford | |
| 2019/0335679 A1 * | 11/2019 | Li | A01G 9/027 |

FOREIGN PATENT DOCUMENTS

| | | | |
|---|---|---|---|
| KR | 10-1009461 | 1/2011 | |
| KR | 10-1232644 | 2/2013 | |
| WO | WO-2012139158 A1 * | 10/2012 | A01G 31/06 |
| WO | 2015082924 A1 | 6/2015 | |
| WO | 2015152206 A1 | 10/2015 | |
| WO | 2017103922 A1 | 6/2017 | |

OTHER PUBLICATIONS

Suzhou Huanmei Horticulture Technology Co., LTD. Product Literature, Plant Growing Plastic Flat Tray for Greenhouse, Seeding, Wheatgrass FT1010. https://huanmei.en.made-in-china.com/product/LsWJfGVxaocK/China-Plant-Growing-Plastic-Flat-Tray-for-Greenhouse-Seeding-Wheatgrass-FT1010.html.

* cited by examiner

NESTING CONTAINER FOR VERTICAL FARM

CROSS-REFERENCE TO RELATED APPLICATION

The present application claims priority benefit to a provisional patent application entitled "Nesting Container for Vertical Farm," that was filed on Feb. 1, 2019, and assigned Ser. No. 62/800,119. The entire content of the foregoing provisional application is incorporated herein by reference.

TECHNICAL FIELD

Embodiments of the disclosure relate to stackable growth containers used in aeroponic and hydroponic farming.

BACKGROUND

Aeroponic farming involves spraying a liquid nutrient solution on the roots of developing plants. Roots of these plants are generally bare and suspended in a growth chamber where the nutrients are sprayed. In some versions of aeroponic farming, seeds are deposited on the top surface of a cloth that may be supported by a frame. The seeds are provided with the desired germination characteristics in order to promote germination/growth. The cloth with or without the germinating seeds is positioned on the frame and is located within the growth chamber. In the growth chamber, the upper side of the cloth is subjected to light of a wavelength and intensity to promote growth in developing the plants, and the underside of the cloth and the developing root mass is exposed to a nutrient solution. The plants resulting from the seeds are harvested at a desired stage of growth. The growth chambers may be stacked on each other and/or located side-by-side to save space within a facility and to permit sharing of the subsystems. The subsystems provide the nutrient solution and, in certain instances, control one or more of temperature, humidity and carbon dioxide conditions within the growth chambers. A rapidly developing and healthy plant canopy is beneficial in these systems because, inter alia, it reduces the amount of light that reaches the cloth medium and may reduce the formation of harmful algae growth.

Algae formation may occur on the nozzles and the underlying drainage trays. Algae control generally involves cleaning and/or filtration to prevent the spread of the algae into other parts of the growing system. The presence of algae on the growth chamber is aesthetically undesirable and makes cleaning of the growth chamber between uses more difficult and costly. The presence of algae on the growth chamber may also result in plugging of the cloth and interference with the nutrient solution spray and/or air flow. The added cleaning, the expense of filters, and the associated growth tower downtime for filter changeouts and hardware cleaning are costly.

Evaporation of water from the cloth and/or growth chamber used in some aeroponic farming can lead to increased costs required for air conditioning of the indoor farm and excess water use.

Thus, a need exists for growth chambers that may be used in aeroponic or hydroponic farming that improve, for example, harvest yields, reduce algae growth, reduce costs associate with cleaning and automatic seeding, and reduce evaporation of water.

SUMMARY

The present disclosure provides a container for use in aeroponic or hydroponic growth systems. The disclosed container may be used individually or with at least one other container. For example, the disclosed container may be configured for use in vertical farming configurations with at least two containers, such that a first container and a second container are positioned in close proximity to each other. In addition, a plurality of containers (e.g., three or more) may be configured for use in a vertical farming configuration, as will be explained in more detail below.

In embodiments of the disclosure, the term "developing plant(s)" may refer to one or more germinating seeds, one or more seedlings with or without true leaves, one or more growing plants, and any combination thereof.

In embodiments of the disclosure, the term "fluid" may refer to a liquid, gas, and any combination thereof. The disclosed liquid may refer to water, nutrient solution, and any combination thereof.

The disclosed container defines (i) an "interior" configured to interact with a fluid and/or developing plant(s), and (ii) an "exterior" that at least partially defines a perimeter around the interior. The disclosed container may further include stacking features/elements which allow one container to be stacked/nested one upon the other. The disclosed container may further include features/elements which enable one container to be connected to the other, e.g., when positioned in adjacency. The disclosed container may further include (i) features/elements for delivering fluid, (ii) features/elements for draining fluid, and (iii) features/elements for supporting developing plants that are conducive to their growing within the disclosed container. The disclosed container may also include features/elements that aid in the movement of the disclosed container within a growth chamber and positioning of the disclosed container within or on a conveyor, and features/elements that facilitate stacking the disclosed containers upside down on or close to a top edge for draining.

The interior of the disclosed container may be defined by sidewalls and a bottom. In some embodiments, the disclosed sidewalls and bottom may also define the exterior of the disclosed container. In other embodiments, the disclosed container may be of a dual wall design. In such instances, the sidewalls and bottom that define the interior may be different (in whole or in part) relative to the sidewalls and bottom that define the exterior. The dual wall design may completely enclose at least one hollow cavity that is essentially sealed from the environment. However, unless otherwise stated, the disclosed sidewalls and bottom will be discussed without reference to the "interior" or "exterior". In some embodiments, the disclosed sidewalls may be at least partially tapered such that the disclosed bottom may have a smaller area than the interior opening, opposite the disclosed bottom. Sidewalls having a tapered configuration may facilitate stacking/nesting of additional container(s). However, sidewalls that are not tapered may also facilitate stacking/nesting of additional container(s).

The disclosed container may include stacking/nesting features/elements that may be fabricated with the disclosed container or may be assembled thereafter. In some embodiments, sidewalls may include correspondingly configured recessed and protruding portions. For example, the interior of the disclosed sidewall may include a recessed portion that is configured and dimensioned to receive a protruding portion that is at least partially positioned and/or defined on the exterior of the disclosed sidewall. The recessed portion may include a ledge or other stopping feature/element to ensure consistent association with the protruding portion.

In one embodiment, where the disclosed sidewalls have a partially inward taper, the disclosed container(s) may be stacked/nested one upon the other. In stacking/nesting the disclosed containers, the protruding portion positioned on the exterior of the disclosed sidewall of a first container may interface with the recessed portion positioned on the interior of the disclosed sidewall of a second container. The second container is positioned below the first container such that the first container is stacked/nested with the second container.

The disclosed bottom may be defined as having a flat/planar surface or a non-flat/non-planar surface. In some embodiments, the interior of the disclosed bottom may be defined as having a non-flat/non-planar surface. As used throughout, non-flat/non-planar may be used interchangeably with pitched, slanted, tapered, tilted, inclined/declined, curved, bowed, and any other word, phrase or geometry that refers or corresponds to a non-flat/non-planar surface. The disclosed bottom may be planar. In some embodiments of the disclosure, a bottom of the container may be a combination of planar surfaces and non-planar surfaces that facilitate drainage of a fluid in the container without tipping the container. In other embodiments of the disclosure, a bottom of the container may have a substantially flat or planar surface, such a container can be positioned on an angled rail or track of the grow tower, the angle or pitch of the track can run from one portion of the grow tower to another portion of the grow tower and can facilitate drainage of a fluid in the container without tipping the container. The disclosed bottom may further include ribbing features/elements positioned relative to the disclosed bottom. The disclosed ribbing may facilitate drainage of a fluid. The disclosed ribbing may provide structural integrity/rigidity to the disclosed container.

The disclosed container may further define features/elements for delivering fluid. The disclosed features/elements may be positioned within the interior of the disclosed container, external to the disclosed container, or partially within the interior and partially external to the disclosed container. The disclosed features/elements may be further utilized to join one or more containers. The one or more containers may be in communication (e.g., fluid, electrical, thermal) with each other. In some embodiments, the features/elements for delivering fluid include one or more pipes positioned at least partially within the interior of the disclosed container. The one or more pipes may be associated with one or more pipe fittings. The pipe fittings may be positioned within the interior of the disclosed container, external to the disclosed container, or partially within the interior and partially external to the disclosed container. In some embodiments the one or more pipes may form an irrigation assembly. The irrigation assembly may further include one or more nozzles that spray or deliver fluid to the plant roots. In some embodiments, the fluid may be a liquid which is at least partially a nutrient solution. The disclosed pipe fittings may be utilized to couple one or more containers.

The disclosed container may further include features/elements for discharging a fluid. The disclosed features/elements may be positioned within the interior of the disclosed container, external to the disclosed container, or partially within the interior and partially external to the disclosed container. For example, the disclosed features/elements for discharging a fluid may include a drain hole in communication with at least the interior of the disclosed container. Particularly, the disclosed drain hole may be at least partially defined by or positioned relative to the bottom of the disclosed container.

The disclosed container may further include features/elements for supporting developing plants that are conducive to their growing within the disclosed container. The disclosed container may accommodate a growth medium (e.g., cloth, fabric), a frame, a vapor barrier (e.g., silicone, plastic) and any combination thereof. In some embodiments of the disclosure, two or more frames with growth media may be positioned within a container. Adjacent edges of the frames can span from one side of the container across to the opposite side of the container. Portions of the frames with growth media can be positioned on a ledge or edge of the container. The adjacent and parallel edges of the frames that span across the container can strengthen and/or brace the opposing sidewalls of the container. In some other embodiments of the disclosure, a separate container spacing member can span opposing sidewalls of the container and can be used to strengthen and/or brace the opposing sidewalls of the container. When adjacent containers are connected in a coupled-line to develop plants, pressuring the irrigation system may cause the sidewalls of adjacent connected containers to flex and may cause leaks between joined fittings in the coupled-line. Frame edges and/or a container spacing member can reduce container flexing and maintain leak free seals between containers. Frame edges and/or a container spacing member can also maintain the tolerance in size of the coupled-line of containers when positioned on a tower.

The stackable standalone container in embodiments of the disclosure can be translated singly, or as part of a couple-line of connected containers, through a level of a grow tower. The interior portion of the stackable container can include irrigation conduits and misting or spray devices. The container can include a growth medium covering open portions of the container. The growth medium can be secured to a frame to form an assembly that can be positioned over the open portions of the container.

The embodiments disclosed herein meets these and other needs by providing a system and method for reducing liquid evaporation, increasing plant growth, reducing sanitation time, and accommodating an automated vertical farm.

DETAILED DESCRIPTION

Figure 1:
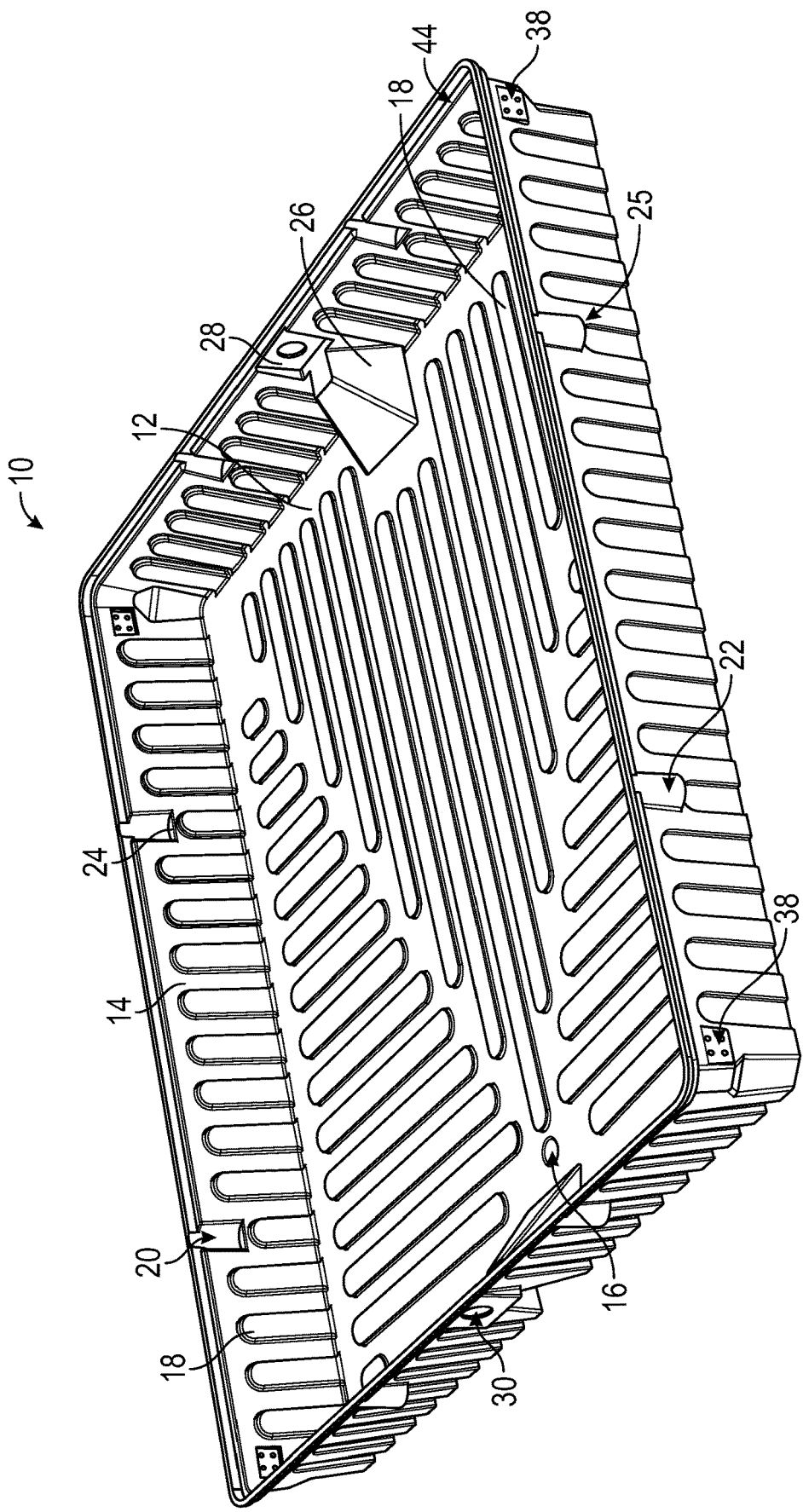
FIG. 1 schematically depicts a perspective view of an advantageous container according to the present disclosure.

In the following description, it is understood that terms such as "top," "bottom," "outward," "inward," "internal," "external," and the like are words of convenience and are not to be construed as limiting terms. Reference will now be made in detail to exemplary embodiments of the disclosure, which are illustrated in the accompanying figures and examples. Referring to the drawings in general, it will be understood that the illustrations are for the purpose of describing particular embodiments of the disclosure and are not intended to limit the same.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

In embodiments of the disclosure, the term "developing plant(s)" may refer to one or more germinating seeds, one or more seedlings with or without true leaves, one or more growing plants, and any combination thereof.

In embodiments of the disclosure, the term "fluid" may refer to a liquid, gas, and any combination thereof. The disclosed liquid may refer to water, nutrient solution, and any combination thereof.

In embodiments of the disclosure, unless otherwise stated, the sidewalls of the disclosed container will be discussed without reference to the "interior" or the "exterior" of the sidewalls.

According to the present disclosure, the disclosed container defines (i) an "interior" configured to interact with a fluid and/or developing plants, and (ii) an "exterior" that at least partially defines a perimeter around the interior. The disclosed container may further include stacking features/elements which allow one container to be stacked/nested one upon the other. The disclosed container may further include features/elements which enable one container to be connected one adjacent to the other. The disclosed container may further include (i) features/elements for delivering fluid, (ii) features/elements for draining fluid, and (iii) features/elements for supporting developing plants that are conducive to their growing within the disclosed container. The disclosed container may further include stacking features/elements which allow one container to drain interior surfaces while being stacked/nested one upon the other with the fluid delivery features/elements in place.

Referring now to the drawings, like parts are marked throughout the specification and drawings with the same reference numerals, respectively. Drawing figures are not necessarily to scale and in certain views, parts may have been exaggerated for purposes of clarity.

As depicted in FIGS. 1-3 and 7-9, bottom 12 and at least one sidewall 14 in part define an interior and an exterior of container 10. Bottom 12 and/or at least one sidewall 14 may define a shape (e.g., quadrilateral, cylindrical). Container 10 may include a plurality of sidewalls 14. The interior may be configured to interact with a fluid and/or developing plants. The exterior may at least partially define a perimeter around the interior.

Bottom 12 may be defined as having a flat surface and/or a non-flat surface. Non-flat surface may be referenced herein as pitched, slanted, tapered, tilted, inclined/declined, curved and/or bowed. The disclosed non-flat surface may promote drainage of a fluid from the interior of container 10. Bottom 12 having a non-flat surface may, at least in part, facilitate drainage (e.g., of a fluid) without having to tilt container 10. The disclosed non-flat surface may be at least partially pitched/curved towards the disclosed feature/element for draining fluid. The disclosed feature/element for draining fluid may be associated with respect to bottom 12 and/or sidewalls 14. The disclosed feature/element for draining fluid may be drainage hole 16. Bottom 12 may in part define drainage hole 16. Drainage hole 16 may be positioned in close proximity to sidewall 14, in close proximity to the center of bottom 12, and any combination thereof. In some embodiments, the disclosed non-flat surface may be at least partially pitched/curved towards drainage hole 16 that may be positioned in close proximity to sidewall 14. In some embodiments, a plurality of drainage holes 16 may be utilized.

Figure 7:
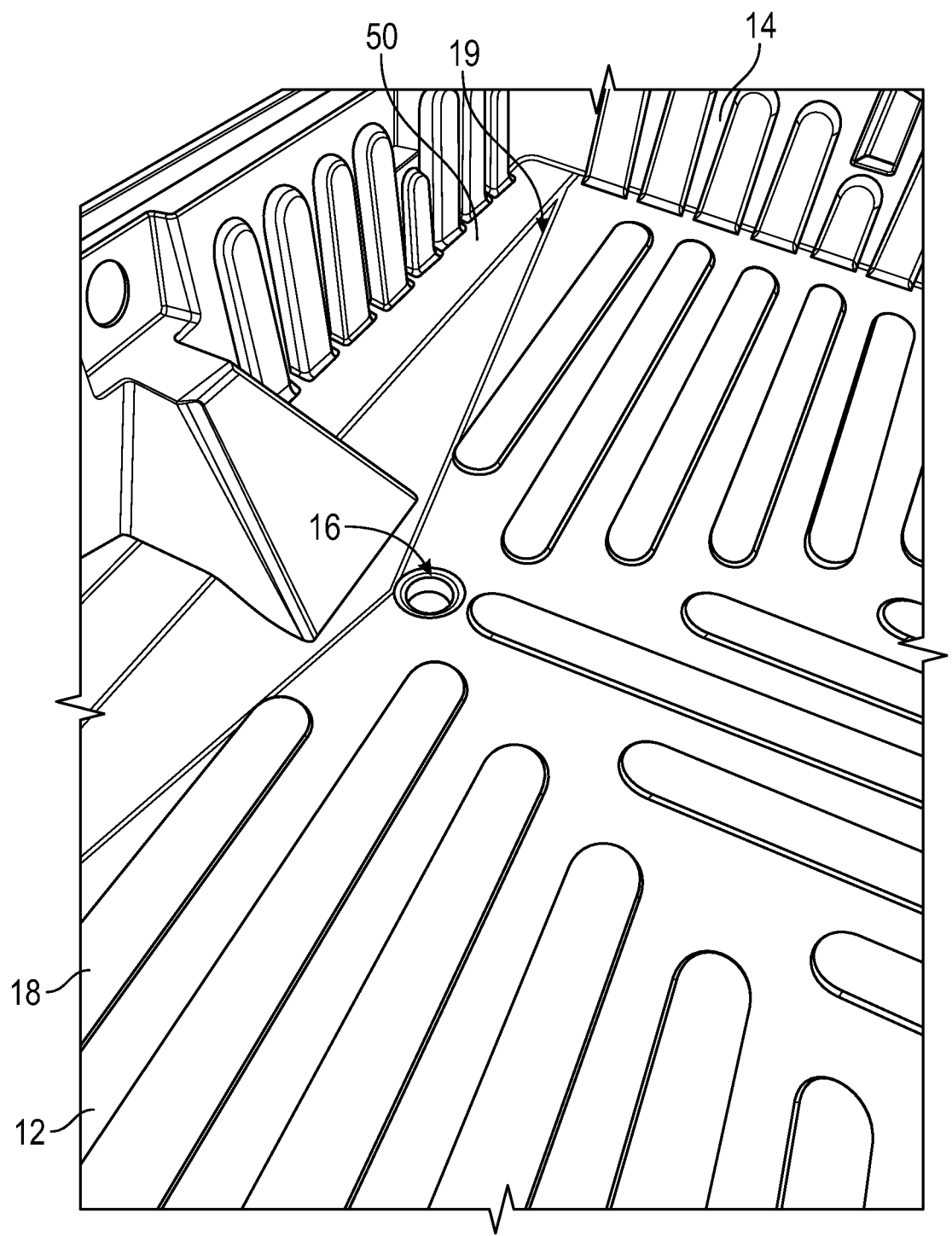
Figure 8:
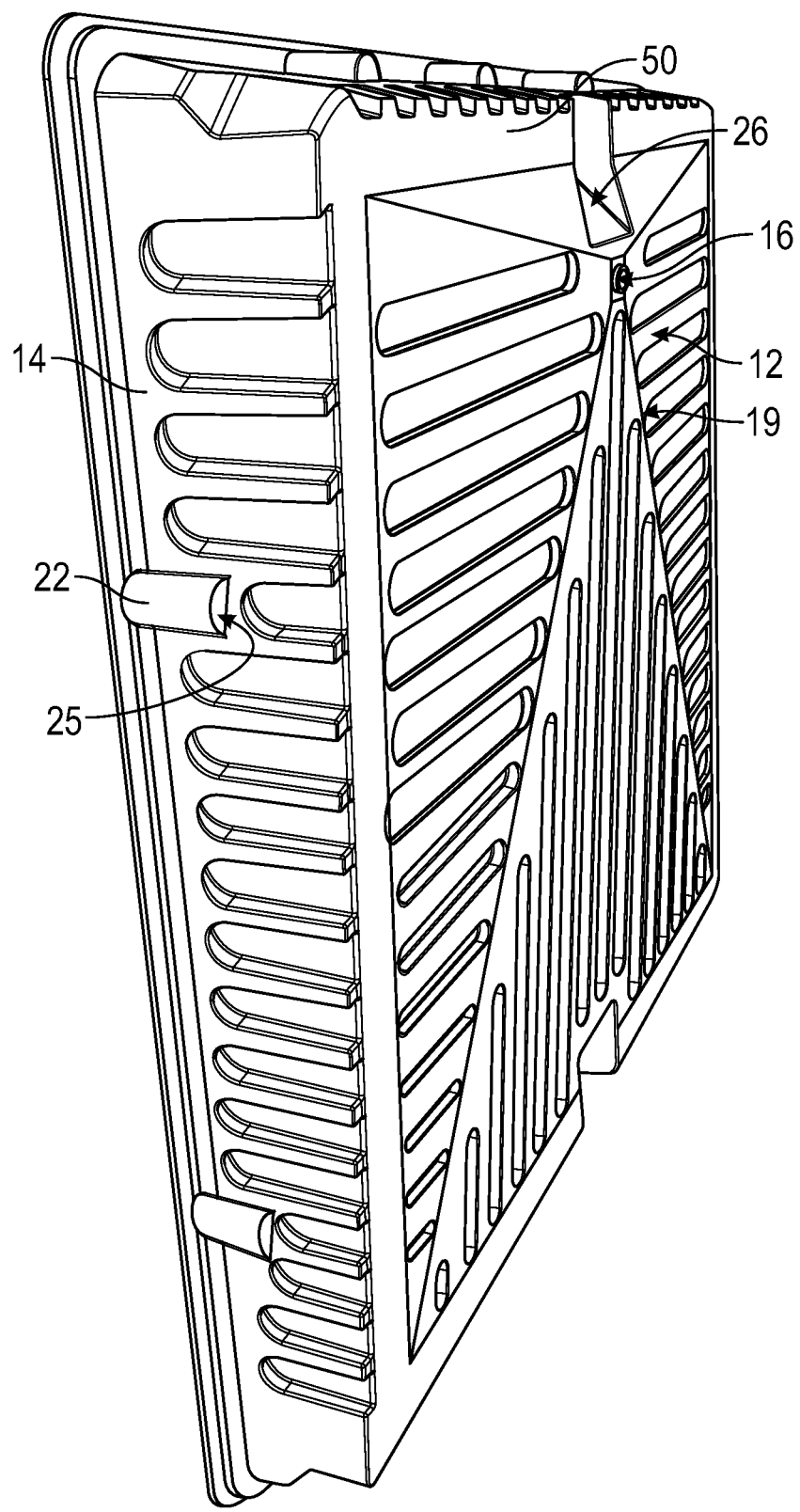
FIG. 8 schematically depicts a perspective view of a bottom of an advantageous container according to the present disclosure.
Figure 9:
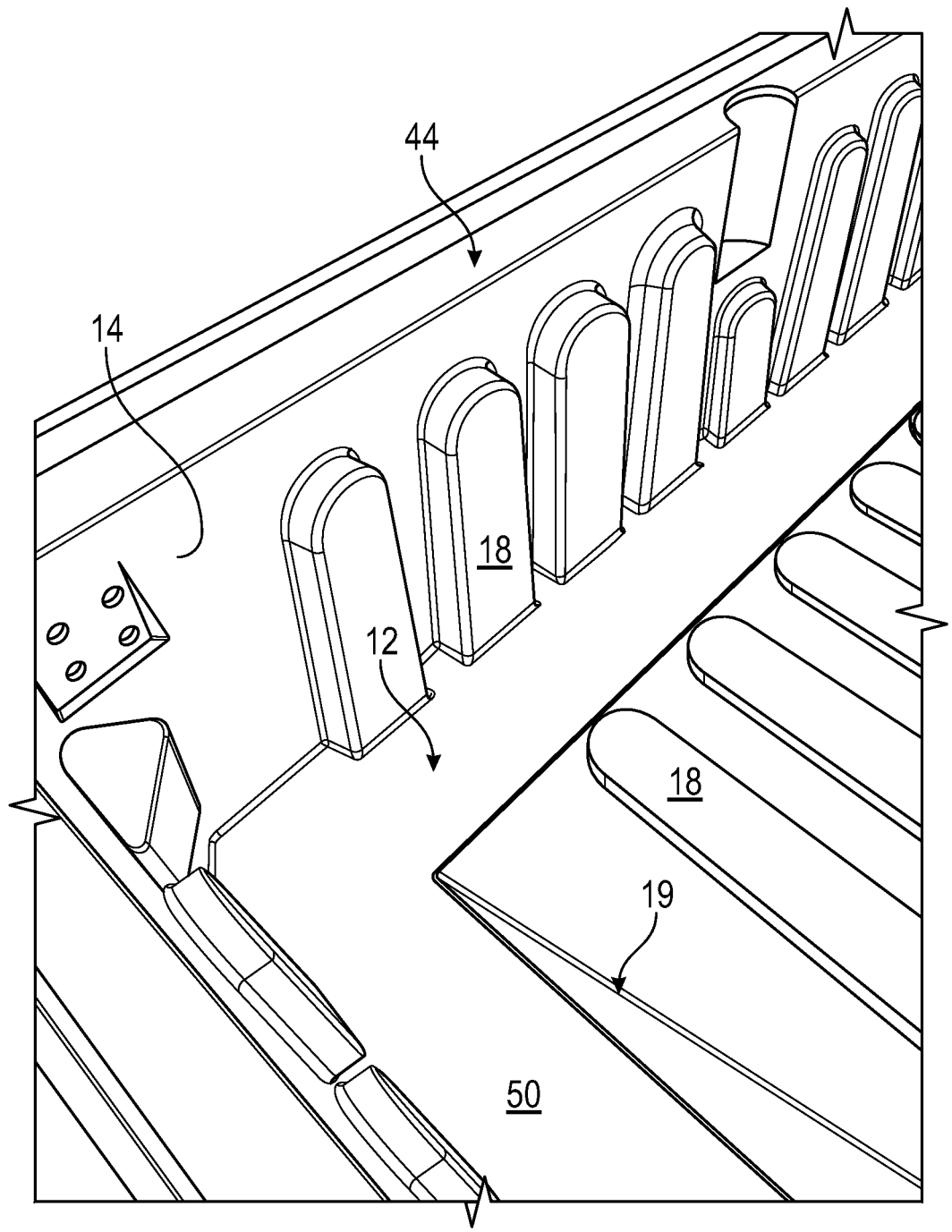
FIG. 9 schematically depicts a detailed view of an advantageous container according to the present disclosure.

In some embodiments, bottom 12 may define a plurality of non-flat surfaces. In other embodiments, bottom 12 may define a plurality of flat and non-flat surfaces. In still other embodiments, bottom 12 may define a substantially flat surface. The plurality of non-flat surfaces (and optional flat surfaces) defined by bottom 12 may be configured to have different trajectories. In one non-limiting example, as depicted in FIGS. 7-9, opposing non-flat surfaces or opposing flat and non-flat surfaces extending from opposing sidewalls 14 may extend partially towards each other so as to define at least one fluid guiding interface 19 (e.g., groove, culvert, channel) whereby fluid may be directed towards drainage hole 16. In another non-limiting example, as illustrated in FIG. 2A, drainage hole 16 may be positioned in close proximity to one sidewall 14. Non-flat surfaces defined by bottom 12 extends on different trajectories towards drainage hole 16 so as to define at least two fluid guiding interfaces 19 for directing fluid towards drainage hole 16. Non-flat surface trajectories may begin in close proximity to sidewalls 14. In some embodiments non-flat surface trajectories may begin in close proximity to sidewalls 14 from a substantially flat surface 50 that are connected to opposing sidewalls 14. Substantially flat surface 50 can slidably engage/mate rails in a grow tower and keep the top edges of the sidewalls 14 across the container substantially level in the grow chamber (See FIG. 5). In some embodiments, bottom 12 may include two opposing substantially flat surfaces 50. However, in other instances, exterior bottom 12 having one or more substantially flat surfaces 50 may be substantially flat and interior bottom 12 may have one or more non-flat surfaces, as outlined above. Despite the several non-limiting examples provided herein, it should be understood that modifications to the trajectory of the flat and non-flat surface(s) defined by bottom 12 are anticipated so as to at least facilitate drainage without having to tip container 10. In some embodiments of the disclosure the grow chamber or grow tower may have angled or pitch surfaces that support substantially flat bottomed containers and facilitate drainage of liquid from the containers without having to tip container 10 on an edge.

In another non-limiting example, as mentioned above and further depicted in FIG. 3, drainage hole 16 may be positioned in close proximity to the center of bottom 12. Non-flat surfaces defined by bottom 12 extends on different trajectories towards drainage hole 16 so as to define at least two fluid guiding interfaces for directing fluid towards drainage hole 16. Non-flat surface trajectories may begin in close proximity to sidewalls 14. Despite the several non-limiting examples provided herein, it should be understood that modifications to the trajectory of the flat and non-flat surface(s) defined by bottom 12 is anticipated so as to at least facilitate drainage without having to tip container 10 on an edge.

Bottom 12 may further define a plurality of ribs 18. Ribs 18 may be fabricated with or mounted with respect to bottom 12. Ribs 18 may be positioned with respect to the interior of bottom 12. Ribs 18 may be three-dimensional and extend inward towards the interior of container 10 from bottom 12. Thus, the exterior of bottom 12 may be devoid of any outwardly extending ribs 18. Ribs 18 may be perpendicular or may be angled with respect to bottom 12. In some embodiments, the positioning of ribs 18 may correspond to the flat and non-flat surfaces defined by bottom 12. Particularly, the positioning of ribs 18 may correspond to the trajectory of non-flat surface(s) defined by bottom 12. Ribs 18 may facilitate drainage of fluid. Particularly, ribs 18 may facilitate drainage of fluid by directing the one or more flow paths of the fluid to the one or more drainage hole(s) 16. Ribs 18 may direct fluid to one or more fluid guiding interfaces 19, wherein the one or more fluid guiding interfaces 19 direct the fluid to the one or more drainage hole(s) 16. Ribs 18 may be variably-sized (e.g., height, width, length) so as to promote drainage of the fluid. Ribs 18 may be fabricated from the same material as container 10 or from a different material. Ribs 18 may further provide rigidity to container 10.

Figure 6:
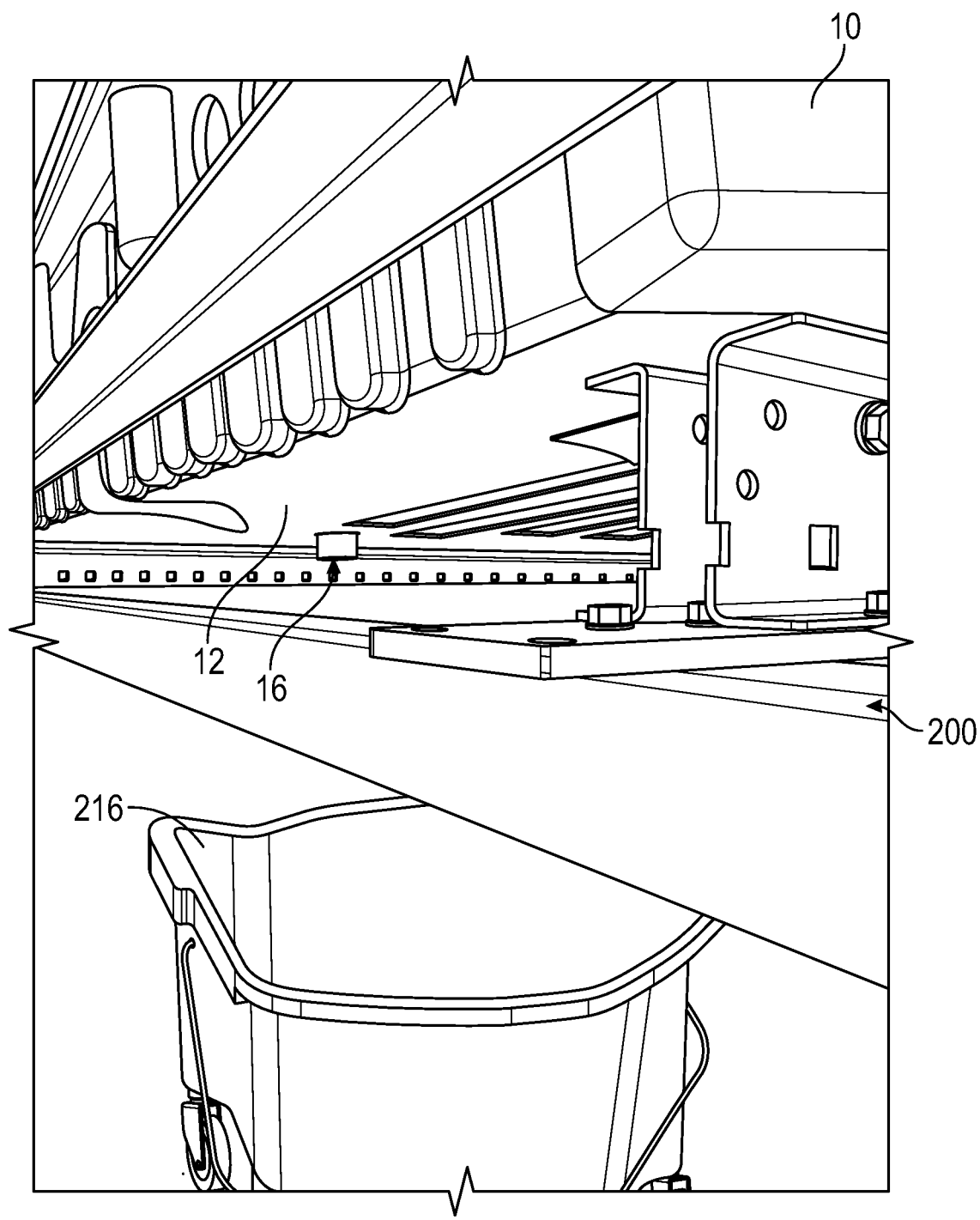
FIG. 6 schematically depicts a perspective view of an advantageous container positioned with respect to a grow tower further including a fluid collecting device, according to the present disclosure FIG. 7 schematically depicts a detailed view of an advantageous container according to the present disclosure.

As depicted in FIGS. 6, drainage hole 16 may be positioned such that fluid draining from drainage hole 16 feeds into a fluid collecting device positioned in close proximity to drainage hole 16, container 10 and/or optionally a hose/pipe extending from drainage hole 16. The disclosed fluid collecting device may be positioned below container 10. Container 10 may be positioned within grow tower 200 such that container 10 is elevated a predetermined distance from the fluid collecting device. The disclosed fluid collecting device 216 (e.g., a gutter, a tub/pail) may collect and optionally relocate fluid to another area. The collected/relocated fluid may be recycled and reused. Containers configured in a stacked/nested configuration may include additional piping so as to capture the discarded fluid and deliver the fluid to the disclosed fluid collecting device. Drainage hole 16 may further include a feature/element for directing fluid from drainage hole 16. For example, a curved spout may be fabricated with or attached to drainage hole 16. The disclosed container may be configured so as to ensure draining fluid from one container 10 does not interact with (e.g., drip on) another container 10 (e.g., a container positioned below the other container). Drainage hole 16 may be configured with a valve or to receive a stopper so as to retain any fluid within container 10.

Figure 10:
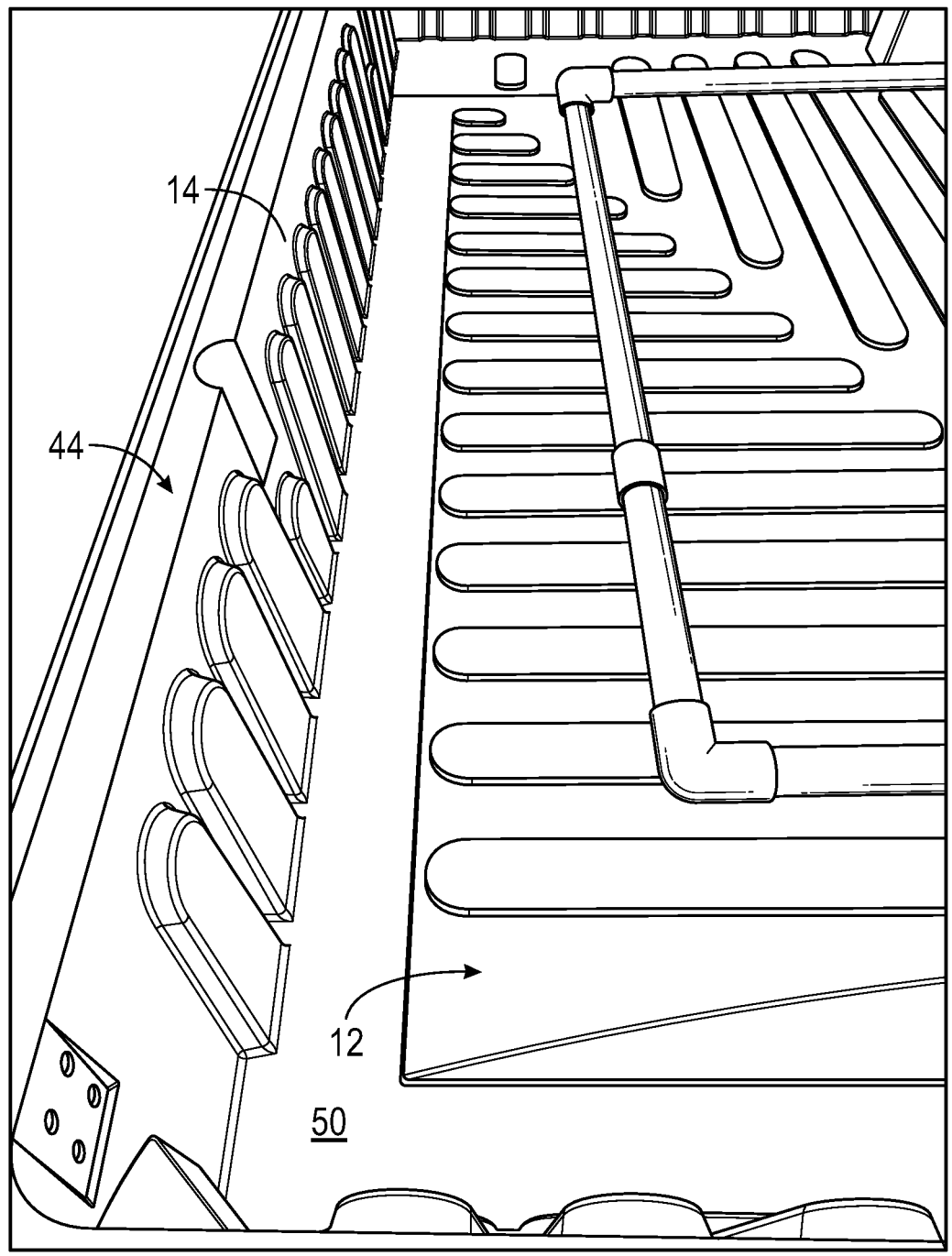
FIG. 10 schematically depicts a detailed view of an advantageous container according to the present disclosure.

Sidewall(s) 14 may be perpendicular and/or angled with respect to bottom 12. Sidewalls 14 may be at least partially tapered such that bottom 12 may have a smaller area than the opening defined by sidewalls 14, which is positioned opposite bottom 12, as depicted in FIG. 10. Sidewalls 14 having a tapered configuration may further facilitate stacking/nesting of additional container(s). Reference is made to the above description.

Sidewalls 14 may further include stacking features/elements which allow one container to be stacked/nested one upon the other. Sidewalls 14 may include stacking/nesting features/elements that may be fabricated with container 10. In another embodiment, sidewalls 14 may include stacking/nesting features/elements that may be assembled to/with container 10. In some embodiments, sidewalls 14 may include at least one pair of correspondingly configured recessed and protruding portions 20,22. For example, the interior of sidewall 14 may include stacking nesting/features such as recessed portion 20 and a corresponding protruding portion 22 positioned on the exterior of side wall 14. The recessed and protruding portions 20, 22 or other stacked/nested features may be located inside the perimeter of the container opening. The stacking/nesting features may be located at various positions on the perimeter or bottom of the container.

Figure 2B:
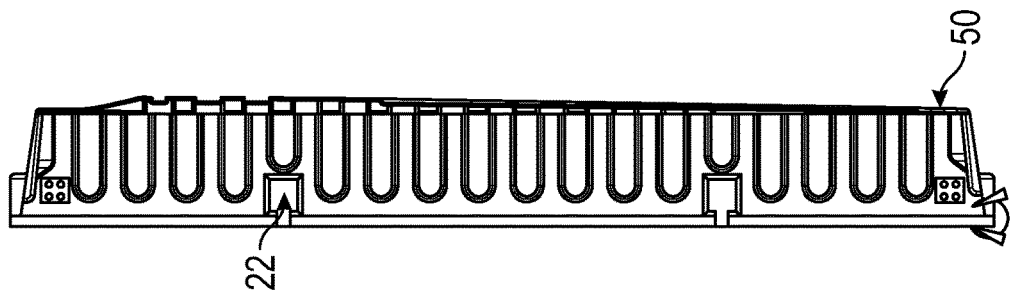
FIG. 2B schematically depicts a cross-sectional view of an advantageous container, as depicted in FIG. 2A, according to the present disclosure.
Figure 2A:
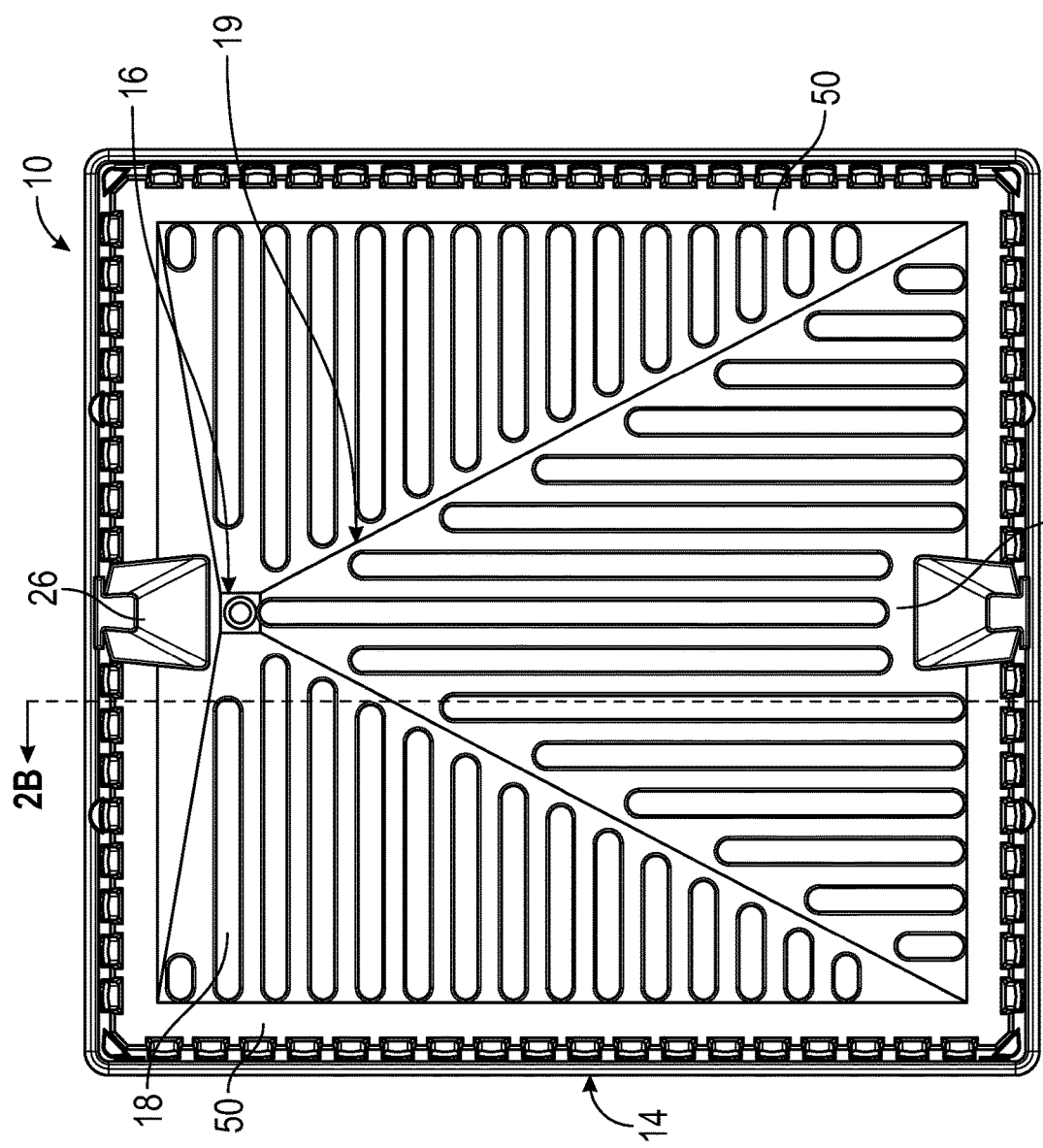
FIG. 2A schematically depicts a top view of an advantageous container according to the present disclosure.
Figure 3:
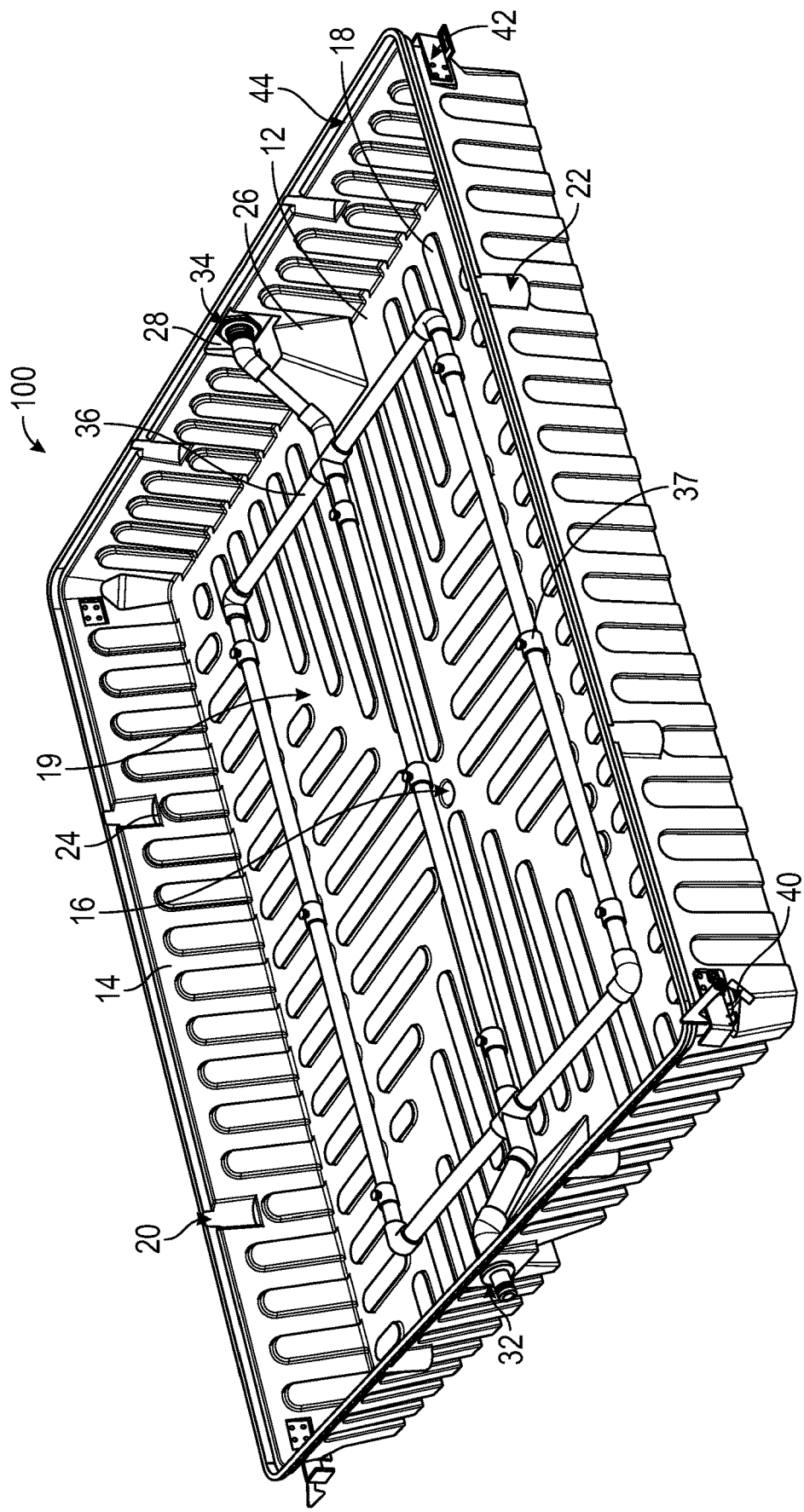
FIG. 3 schematically depicts a perspective view of an advantageous container according to the present disclosure.
Figure 4A:
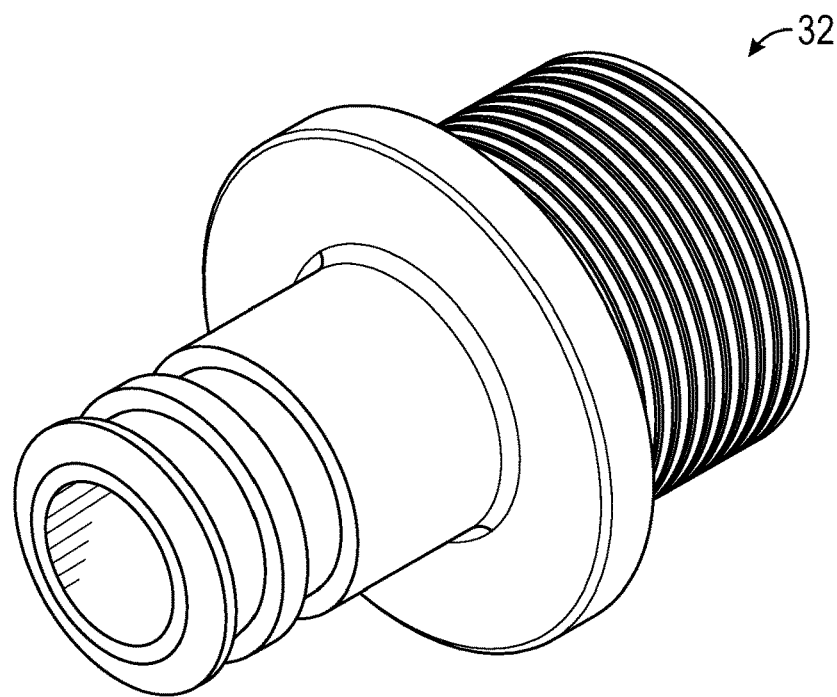
FIG. 4A schematically depicts a perspective view of an advantageous fitting according to the present disclosure.
Figure 4B:
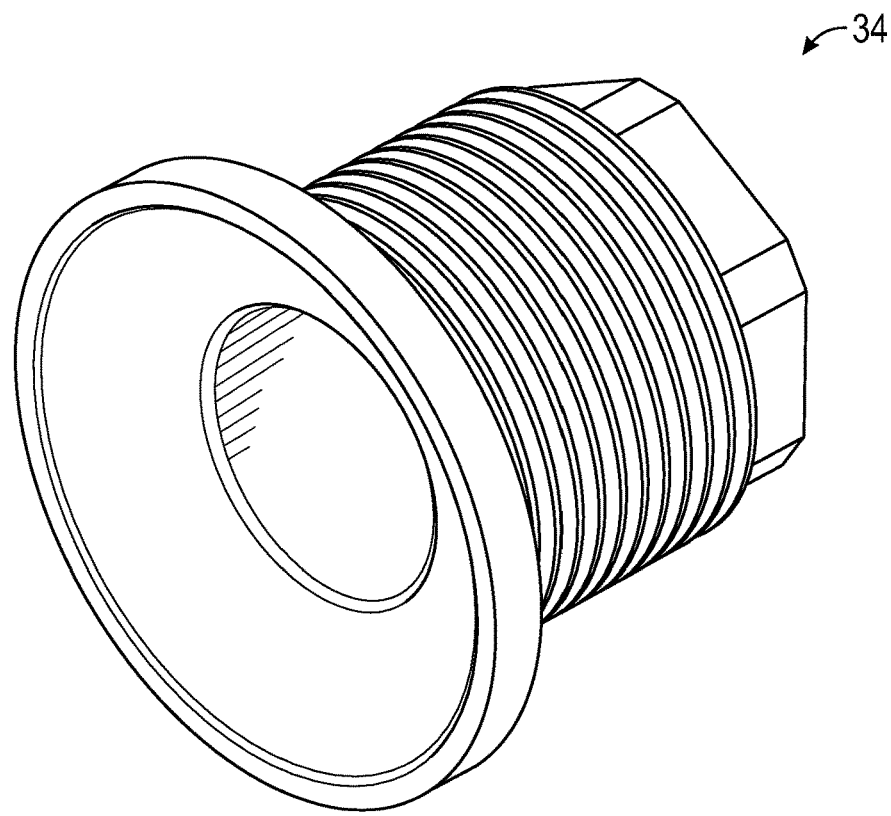
FIG. 4B schematically depicts a perspective view of an advantageous fitting according to the present disclosure.

In some embodiments, as illustrated in FIG. 2A, FIG. 2B, and FIG. 3, the interior of sidewall 14 may include stacking nesting/features such as recessed portion 20 and a corresponding protruding portion 22 positioned on the exterior of side wall 14. The interior of sidewall 14 of one container may include stacking nesting/features such as recessed portion 20 which is configured and dimensioned to receive a corresponding protruding portion 22 positioned on the exterior of side wall 14 of another container. The recessed and protruding portions 20, 22 can be spaced on the sidewalls 14 such that rotating the container 10 in FIG. 3 by 180 degrees also results in the protruding portion 22 positioned on the exterior of side wall 14 of one container being received by the recessed portion 20 on the interior of the side wall 14 of the other container. For example, as illustrated in FIG. 3, recessed and protruding portions 20, 22 can each be located at a distance of about 4 ribs from the corners of the sidewalls. Other distances can be used for the location of the stacking/nesting features in embodiments of the disclosure that permit rotation of the container by 180 degrees and receiving of the protrusion by the recessed portion.

Figure 11:
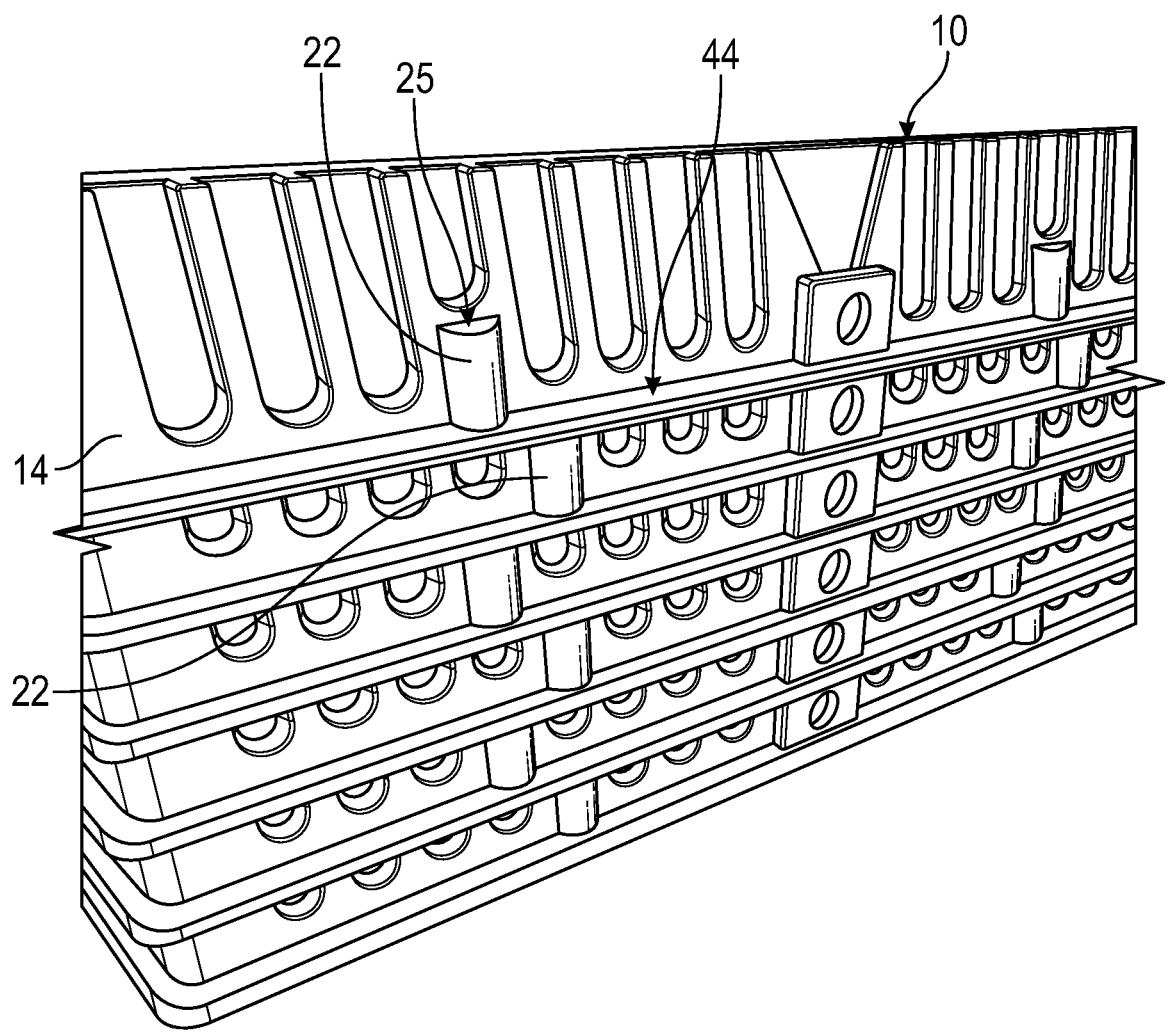
FIG. 11 schematically depicts advantageous containers positioned in a stacking configuration, according to the present disclosure.
Figure 12:
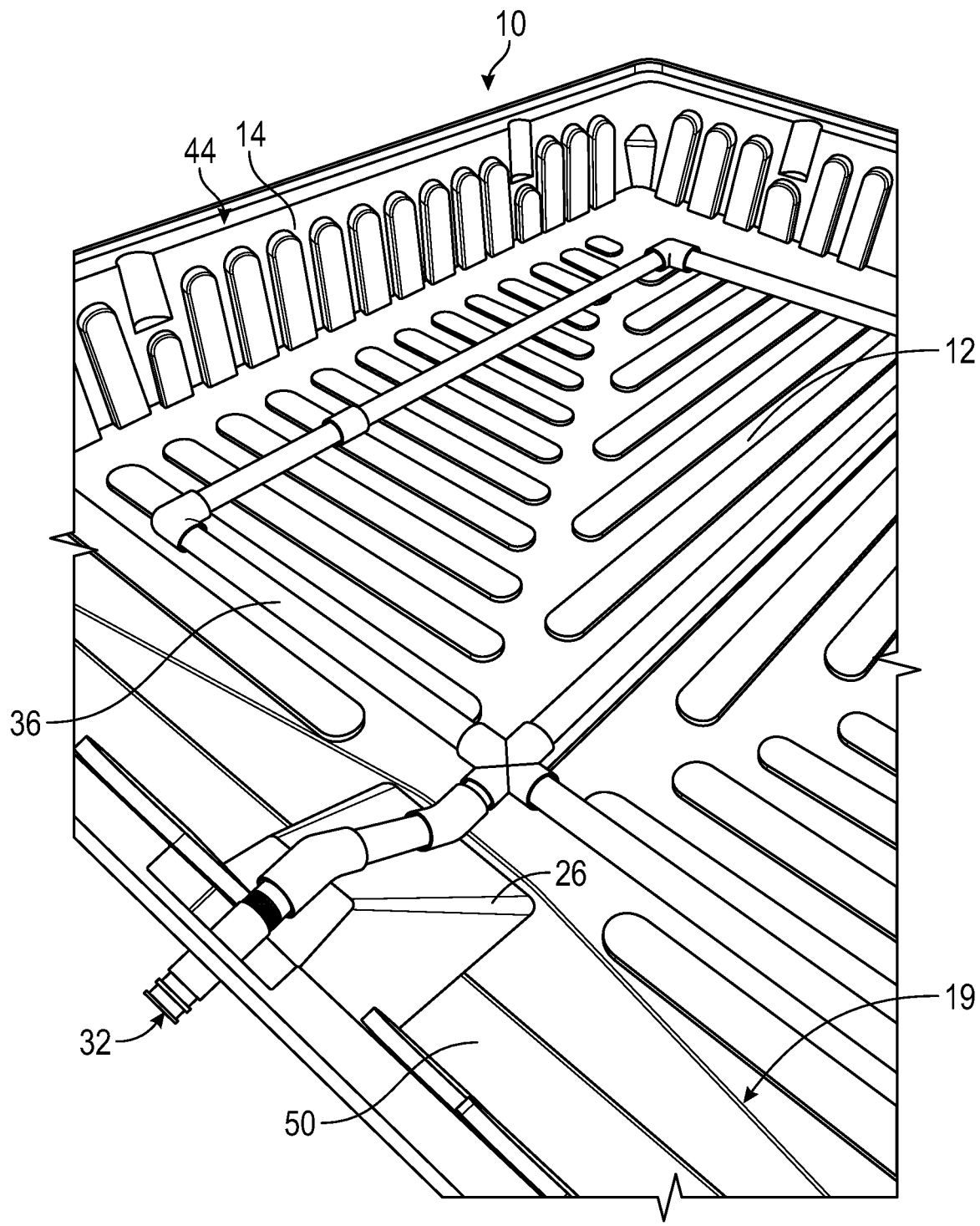
FIG. 12 schematically depicts a perspective view of an advantageous container according to the present disclosure.
Figure 13:
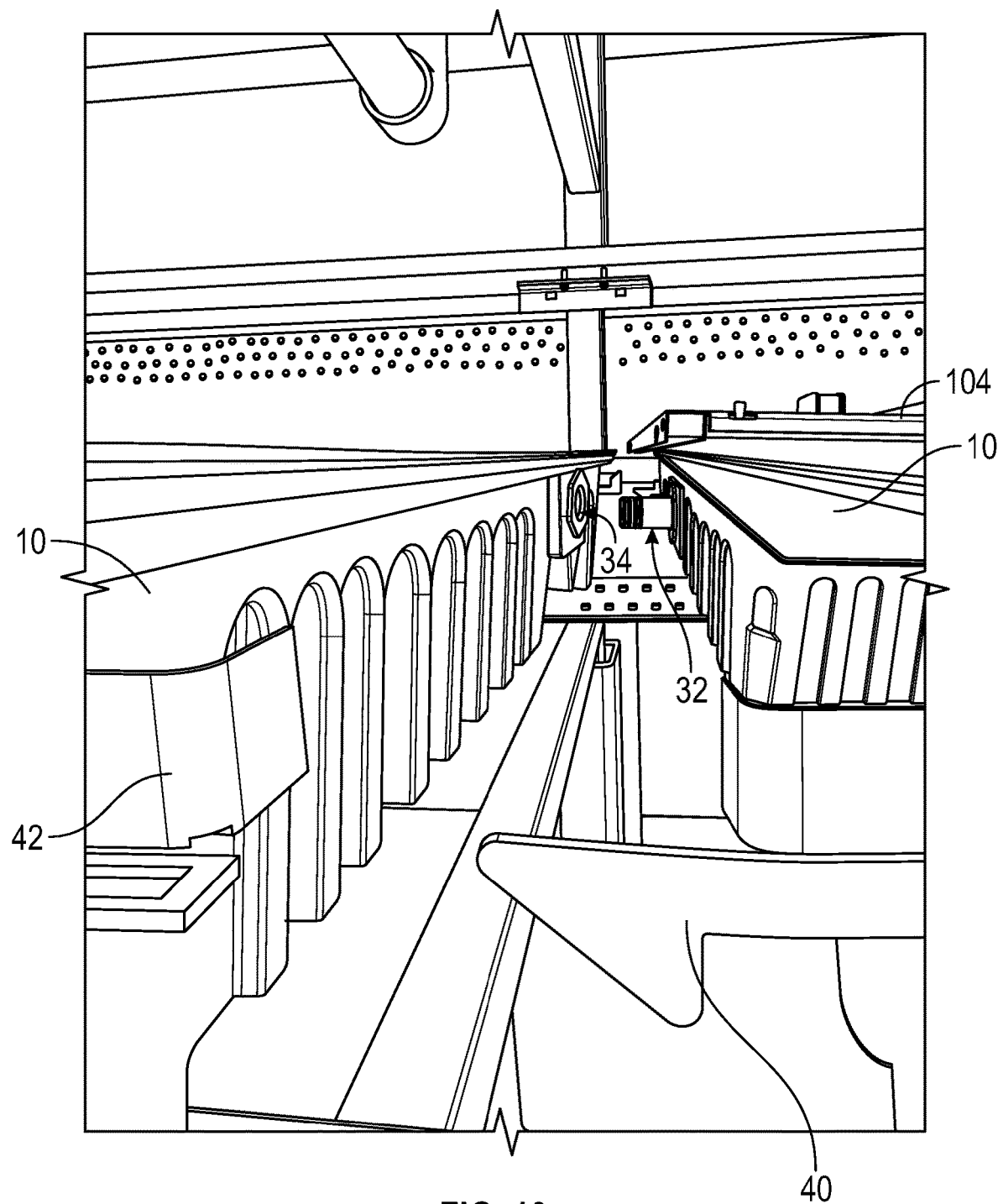
FIG. 13 schematically depicts a side view of two advantageous containers according to the present disclosure.
Figure 14:
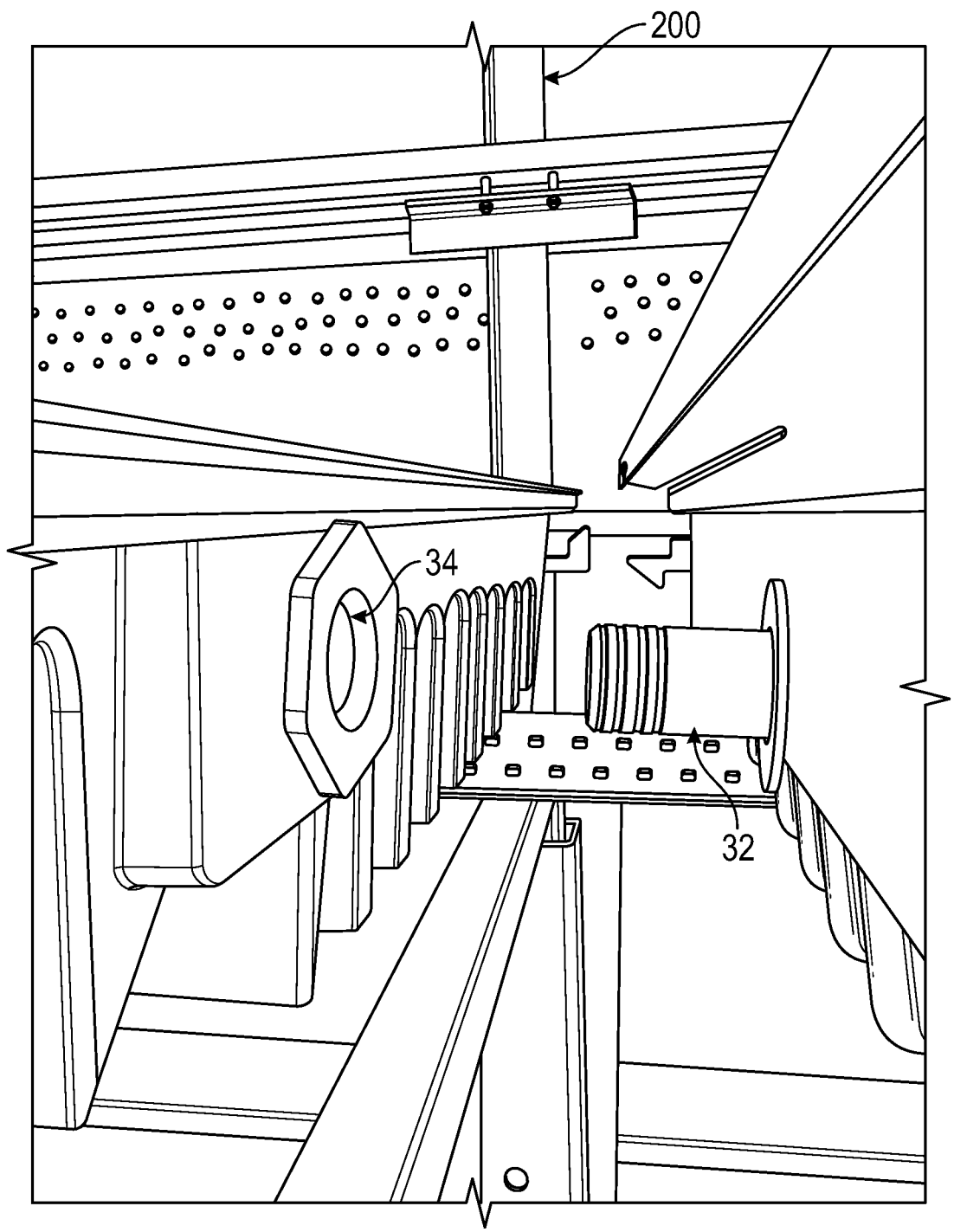
FIG. 14 schematically depicts a detailed view of two advantageous containers according to the present disclosure.
Figure 15:
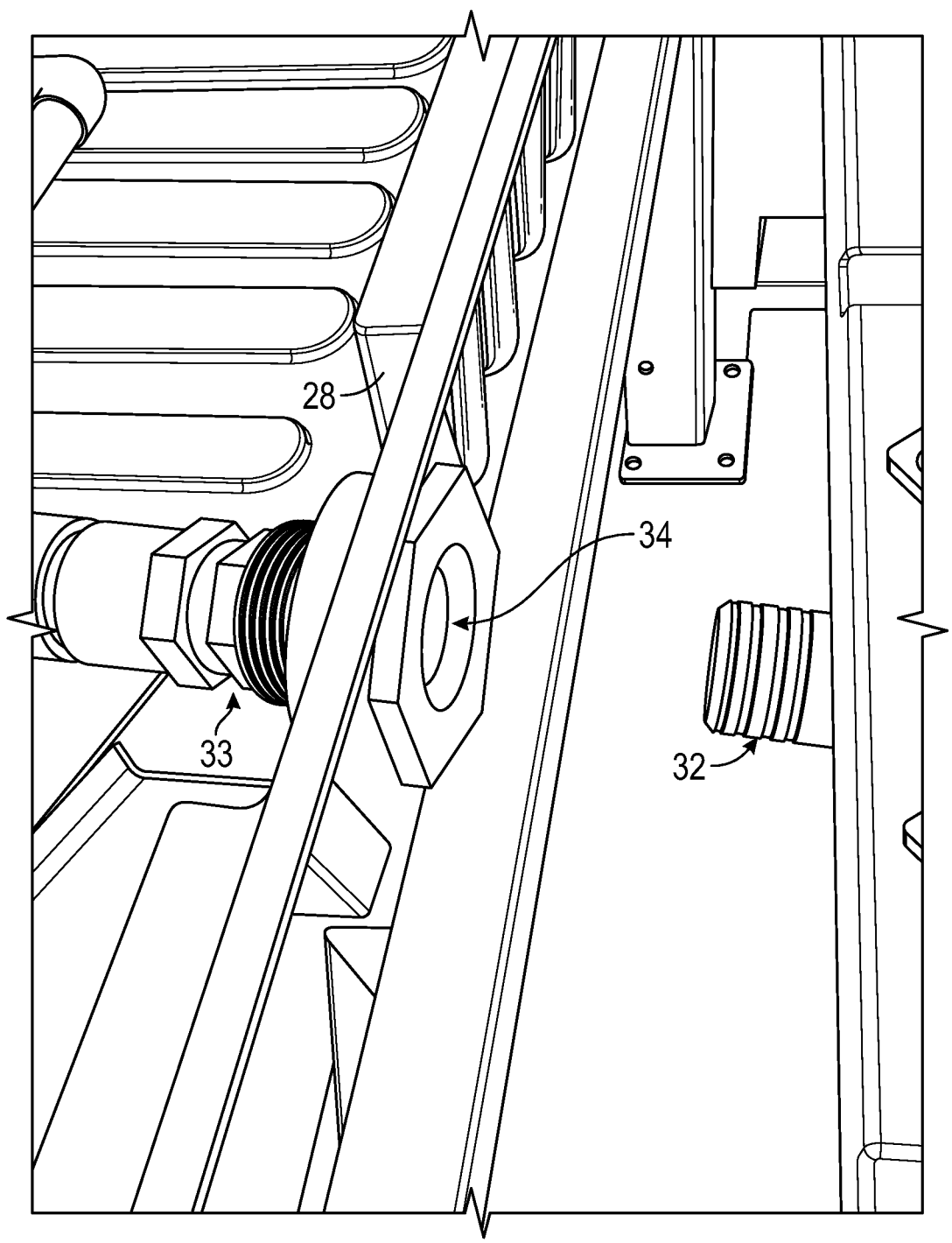
FIG. 15 schematically depicts a detailed view of two advantageous containers according to the present disclosure.
Figure 16:
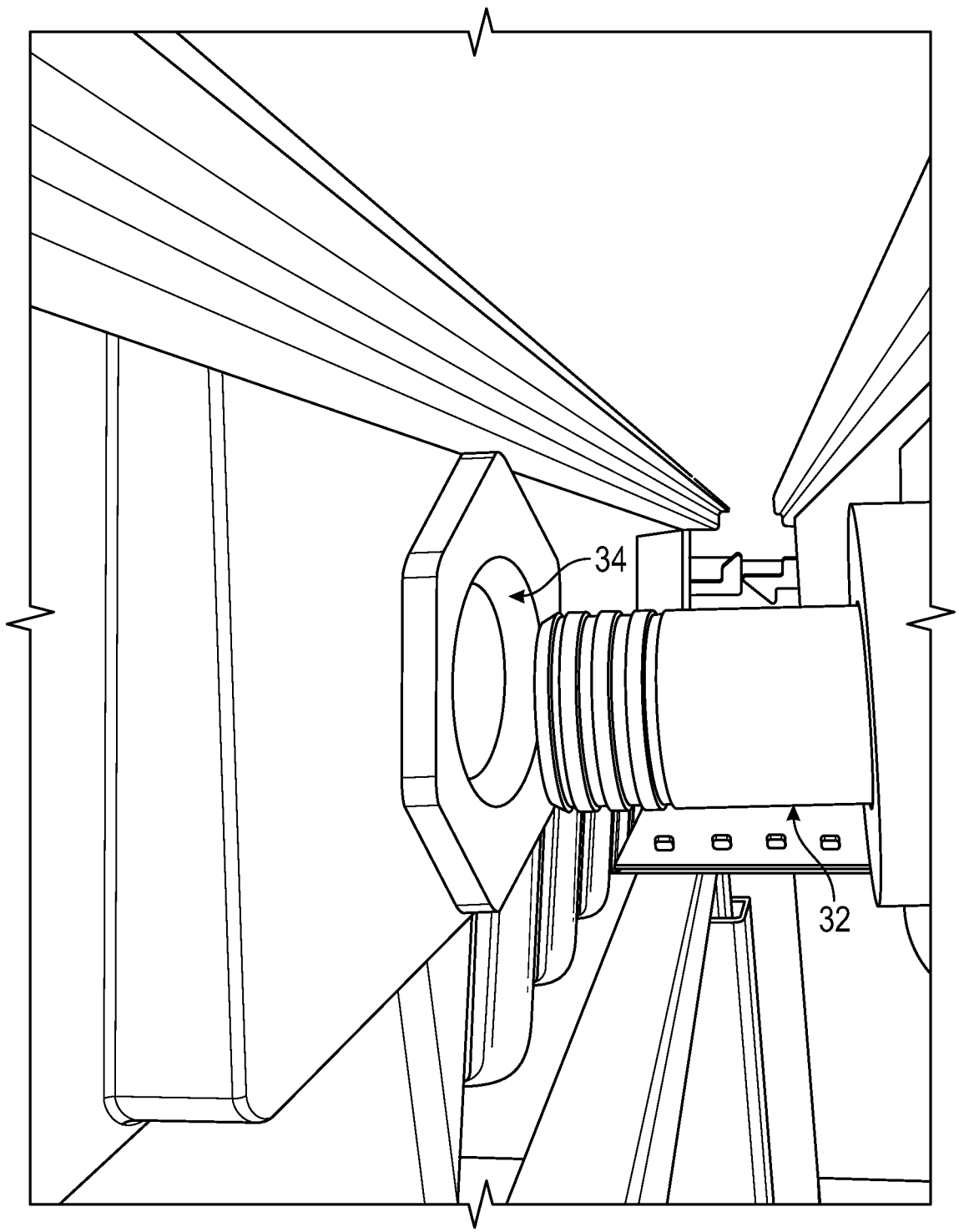
FIG. 16 schematically depicts a detailed view of two advantageous containers according to the present disclosure.
Figure 17:
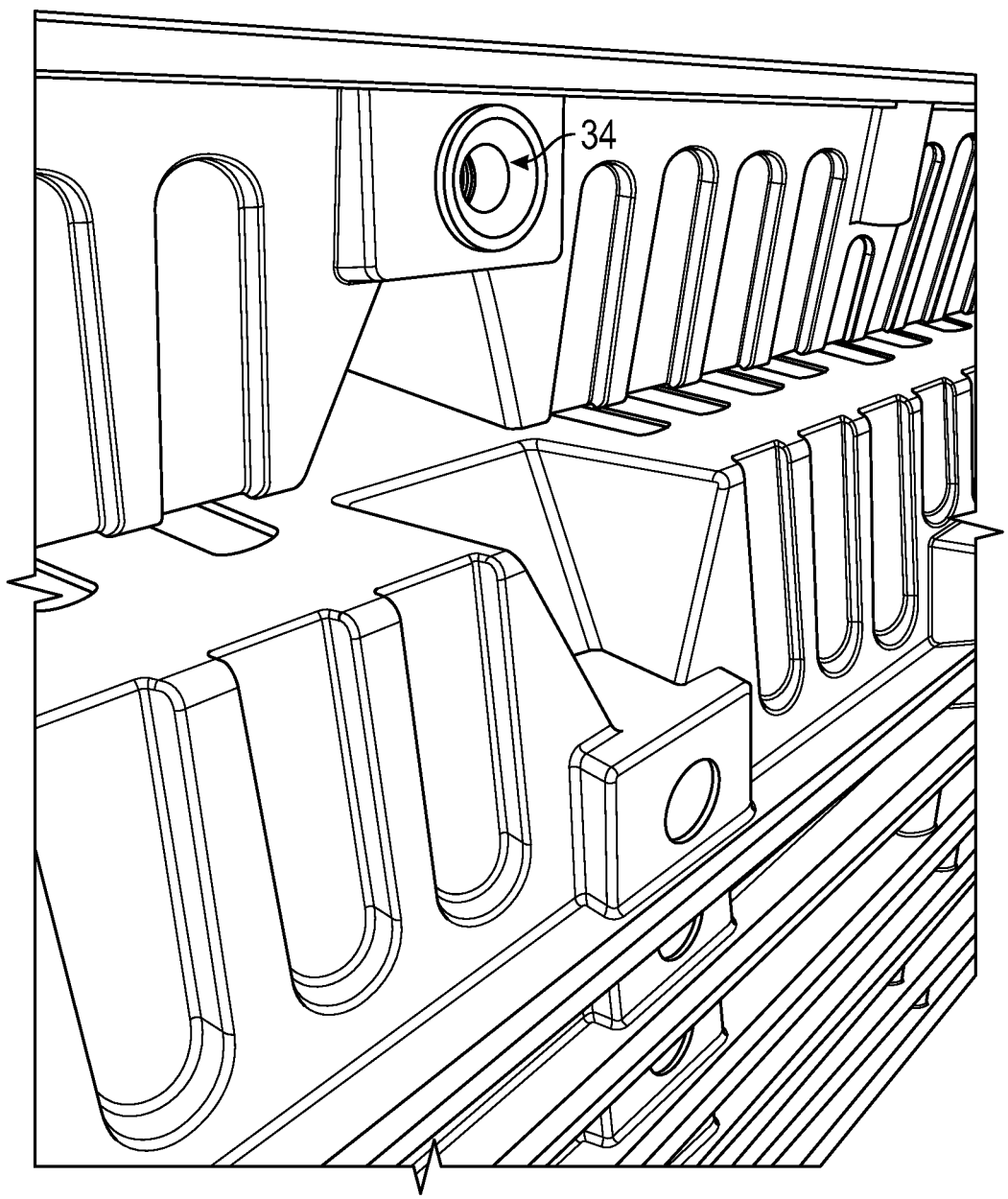
FIG. 17 schematically depicts a detailed view of an advantageous container according to the present disclosure.

In some embodiments, as illustrated in FIG. 8, and FIG. 11, the interior of sidewall 14 may include stacking nesting/features such as recessed portion 20 and a corresponding protruding portion 22 positioned on the exterior of side wall 14. The recessed and protruding portions 20, 22 may be spaced on the side walls 14 such that the protruding portions of one container may not be received in the recessed portions of a second container. In some embodiments a ledge 25 of protruding portion 22 on the exterior of side wall 14 can be supported and/or received by a ledge 44 on the interior of the container as illustrated in FIG. 11. For the container illustrated in FIG. 8, recessed and protruding portions 20, 22 can each be located at different distances from the corners of the container. For example, a first recessed and protruding portion 20, 22 may be positioned about 3 ribs from a first corner and a second recessed and protruding portions 20, 22 may be positioned about 4 ribs from corners of the sidewalls. Other distances can be used in embodiments of the disclosure. As depicted in FIG. 11, containers 10 with this positioning of the recessed and protruding portions 20, 22 may be rotated 180 degrees and stacked in a staggering configuration, such that protruding portions 22 of a first container 10 are offset from protruding portions 22 of a second container 10, which is stacked/nested below the first container 10, and protruding portions 22 of the first container 10 is substantially aligned with protruding portions 22 of a third container 10, which is stacked/nested below the second container 10.

Protruding portion 22 may be at least partially positioned on the exterior of sidewall 14 and/or on the exterior of bottom 12 of container 10. Recessed portion 20 may include stopping feature/element (e.g., ledge as illustrated in FIG. 1) 24 to ensure consistent association with protruding portion 22. Protruding portion may have a stopping feature (e.g., outer ledge as illustrated in FIG. 1) 25 that can contact surfaces of the container.

Recessed portion 20 and protruding portion 22 may be fabricated with container 10. For example, recessed portion 20 and protruding portion 22 may be molded (e.g., thermomolded, rotomolded, injection molded) with container 10. Container 10 may include one or both of recessed portion 20 and protruding portion 22. Sidewalls 14 may further include features/elements that facilitate stacking containers 10 upside down or titled on or close to a top edge so as to facilitate draining, specifically depicted in FIG. 11. The disclosed features/elements may include at least one pair of correspondingly configured recessed and protruding portions 20, 22. However, features/elements may include or may be distinct from the stacking features/elements disclosed above.

In one embodiment, container 10 may be stacked/nested one upon the other such that protruding portion 22 of a first container 10 at least partially engages with recessed portion 20 of a second container 10, which is positioned below the first container 10. Protruding portion 22 may directly or indirectly engage with ledge 24. Protruding portion 22 may directly or indirectly engage with ledge 24 so as to position the first container 10 a predetermined distance from the second container 10. Particularly, the exterior of bottom 12 of the first container 10 is positioned a predetermined distance from the interior of bottom 12 of the second container 10. Thus, containers 10 may be stacked/nested without impacting the contents (e.g., sloped bottom 12 from an adjacent container 10, fluid, features/elements for delivering fluid, features/elements for draining fluid) of container 10 positioned below.

In another embodiment, container 10 may be stacked/nested one upon the other such that protruding portion 22 of a first container 10 at least partially engages with a ledge or step of a second container 10, which is positioned above the first container 10. Protruding portion 22 may directly or indirectly engage with ledge 44. Protruding portion 22 may directly or indirectly engage with ledge 44 so as to position the first container 10 a predetermined distance from the second container 10. Particularly, the exterior of bottom 12 of the first container 10 is positioned a predetermined distance from the interior of bottom 12 of the second container 10. Thus, containers 10 may be stacked/nested without impacting the contents (e.g., sloped bottom 12 from an adjacent container 10, fluid, features/elements for delivering fluid, features/elements for draining fluid) of container 10 positioned below.

In another embodiment, sidewalls 14 may be at least partially tapered, as mentioned above. Tapered sidewalls 14 may facilitate stacking/nesting of containers 10 one upon the other. Container 10 may be stacked/nested one upon the other such that protruding portion 22 of a first container 10 at least partially engages with recessed portion 20 of a second container 10, which is positioned below the first container 10. Protruding portion 22 may directly or indirectly engage with ledge 24. Protruding portion 22 may directly or indirectly engage with ledge 24 so as to position the first container 10 a predetermined distance from the second container 10.

Particularly, the exterior of bottom 12 of the first container 10 is positioned a predetermined distance from the interior of bottom 12 of the second container 10. Thus, containers 10 may be stacked/nested without impacting the contents (e.g., sloped bottom 12 from an adjacent container 10, fluid, features/elements for delivering fluid, features/elements for draining fluid) of container 10 positioned below.

Sidewalls 14 may further include features to at least partially interface with features/elements for delivering fluid, features/elements for draining fluid, and/or features/elements for supporting developing plants that are conducive to their growing within container 10.

In one embodiment, sidewalls 14 may include a drainage feature to remove fluid from the interior of container 10. Sidewalls 14 may include a plurality of drainage features. Drainage features may be positioned in close proximity to bottom 12 or opening of container 10, opposite bottom 12. Drainage features positioned in close proximity to opening of container 10 may drain fluid once a predetermined amount is achieved so as to ensure a desired fluid level is maintained.

Sidewalls 14 may further define a plurality of ribs 18. Ribs 18 may be fabricated with or mounted with respect to sidewalls 14. Ribs 18 may be three-dimensional and extend inward towards the interior of container 10 from sidewalls 14. Ribs 18 may be perpendicular, radiused, or may be angled with respect to sidewalls 14. In some embodiments, the positioning of ribs 18 may, in part, correspond to the flat and non-flat surfaces defined by bottom 12. Particularly, the positioning of ribs 18 may correspond to the trajectory of non-flat surface(s) defined by bottom 12. Ribs 18 may facilitate drainage of fluid. Particularly, ribs 18 may facilitate drainage of fluid by directing the one or more flow paths of the fluid to the one or more drainage hole(s) 16. Ribs 18 may be variably-sized (e.g., height, width, length) so as to promote drainage of the fluid. Ribs 18 may be fabricated from the same material as container 10 or from a different material. Ribs 18 may further provide rigidity to container 10.

In some embodiments of the disclosure the bottom surface may be substantially non-ribbed or have no ribs at all. In other embodiments of the disclosure, the sidewalls may be substantially non-ribbed or have no ribs at all.

Container 10 may further include at least one ramp 26 which may be positioned in close proximity to one or both of bottom 12 and sidewalls 14. In a non-limiting example, at least one ramp 26 may be positioned in relation to both bottom 12 and sidewalls 14 in direct/indirect contact thereto. At least one ramp 26 may increase the rigidity of container 10. At least one ramp 26 may increase the rigidity of container 10 and may align with fluid fitting(s) and oppose forces generated by a pressurized fluid within the fitting(s). At least one ramp 26 may increase the rigidity of container 10 in combination with or separate from ribs 18. At least one ramp 26 may further provide support for one or more features/elements. In a non-limiting example, at least one ramp 26 may provide support for any one of (i) features/elements for delivering fluid, (ii) features/elements for draining fluid, and (iii) features/elements for supporting developing plants that are conducive to their growing within container 10. At least one ramp 26 may further promote stacking/nesting of containers 10. At least one ramp 26 may be substantially hollow so as to facilitate stacking/nesting with containers 10 having at least one ramp 26. The surface of the at least one ramp 26 on the exterior of the container 10 may originate in part from the bottom surface 12 of the container 10 as illustrated in FIG. 8. Thus, the at least one ramp 26 of the below container 10 would at least partially fit within the hollow portion of the at least one ramp 26 of the above container 10. Container 10 may include two oppositely positioned ramps 26. In some embodiments, as illustrated in FIG. 11, the at least one ramp 26 of the below container 10 can at least partially fit within the hollow portion of the at least one ramp 26 of the above container 10; the above container and below container can be rotated 180 degrees from each other. In some embodiments, container 10 may be absent ramps 26.

Container 10 may further define features/elements for delivering fluid, as further depicted in FIGS. 3, 4 and 12-17. The disclosed features/elements may be positioned within the interior of the disclosed container, external to the disclosed container, or partially within the interior and partially external to the disclosed container. In a non-limiting example, the features/elements for delivering fluid may include irrigation line 36 and one or more fittings 32, 34 (collectively "irrigation assembly") positioned at least partially within the interior of container 10. One or more fittings 32, 34 (e.g., couplings) may at least partially extend through sidewall 14. Particularly, one or more fittings 32, 34 may at least partially extend through opening 30 of sidewall 14. Even more particularly, one or more fittings 32 may at least partially extend through opening 30 associated with partially recessed surface 28 of sidewall 14. One or more fittings 32, 34 which is/are associated with recessed surface 28 may be positioned so as to be at substantially flush with the interior of sidewall 14. In embodiments where container 10 is stacked/nested one upon the other, at least a portion of irrigation assembly (e.g., irrigation line 36, one or more fittings 32, 34) may at least partially fit within hollow portion of the at least one ramp 26 of the upper container 10 so as to facilitate stacking/nesting. The disclosed irrigation assembly may further include one or more nozzles 37 (FIG. 3, FIG. 19 and FIG. 20) that can spray or deliver fluid to the plant roots. At least a portion of irrigation assembly (e.g., irrigation line 36, one or more fittings 32, 34) may be in direct or indirect contact with ramp 26. Removal of one or more of fittings 32, 34 and/or irrigation line 36 is optional prior to stacking/nesting. In some embodiments, containers 10 may be stacked/nested while fittings 32, 34 and/or irrigation line 36 remain assembled stacked/nested container(s) 10. Stacking containers with fittings and/or irrigation lines and nozzles in the container is advantageous for cleaning the container assemblies and reduces the cost and downtime associated with cleaning the containers.

Figure 19:
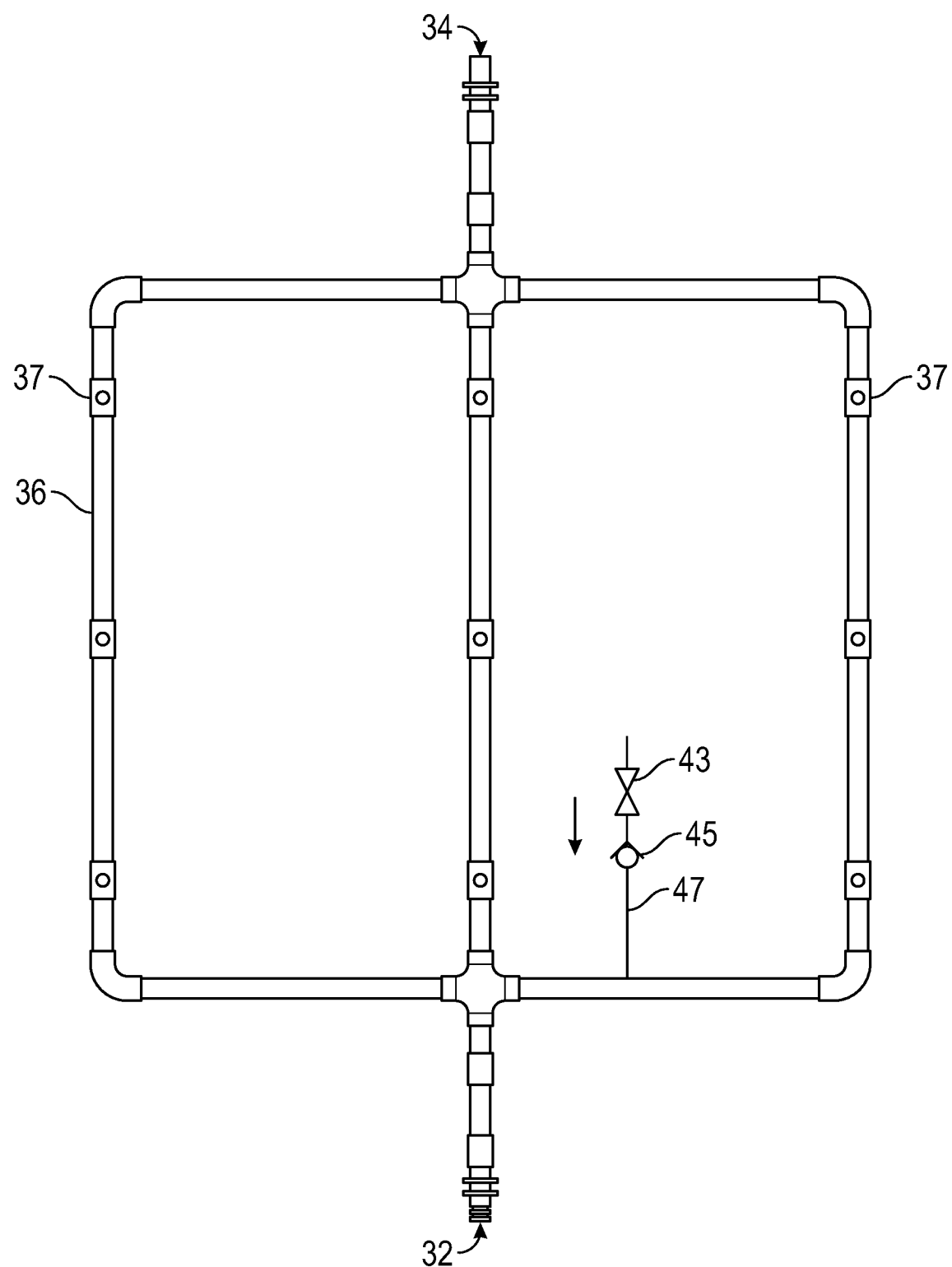
FIG. 19 schematically depicts irrigation lines according to the present disclosure.

Irrigation line 36 may further include a drain line 47. The drain line 47 may include a valve 45 that remains closed when the irrigation line is pressurized with liquid, the valve 45, which may be a check valve, can open to drain the irrigation lines when the pressure of liquid in the irrigation line 36 is reduced. The interior and exterior surfaces of the irrigation lines 36 can be cleaned. The interior irrigation line cleaning may include flushing with cleaning solution and purging with air. FIG. 19 schematically depicts irrigation lines 36 according to an embodiment of the disclosure including nozzles 37 and a drain line 47 with two valve 45 and an optional shutoff valve 43. In FIG. 19, irrigation line fittings 32 and 34 can supply nutrient solution to the container 10 and developing plants. A function of the valve 45 is to stay closed when irrigation line is pressurized and stay open when the irrigation line is not pressurized. In some embodiments of the disclosure the irrigation line can be pressurized to about 60±20 pounds per square inch (psi). The valve 45 may have a low pressure threshold for opening and closing and can be from about 0 to 5 pounds per square inch pressure.

In another embodiment of the disclosure, irrigation assembly (e.g., irrigation line 36, one or more fittings 32, 34) may be further utilized to join one or more containers 10. One or more containers 10 may be in communication (e.g., fluid, electrical, thermal) with each other. One or more fittings 32, 34 of a first container 10 may interface with one or more fittings 32, 34 of a second container 10, which is positioned adjacent to the first container 10. In a non-limiting example, a first fitting 32, 34 of the first container 10 engages with a corresponding second fitting 32, 34 of the second container 10. For example, the first fitting of the first container 10 may be a male fitting 32 and the corresponding second fitting of the second container 10 may be a female fitting 34 such that the first container 10 engages with the second container 10. The first fitting of the first container 10 may be a female fitting 34 and the corresponding second fitting of the second container 10 may be a male fitting 32 such that the first container 10 engages with the second container 10. However, additional fitting 32, 34 designs are expected to facilitate communication between at least two containers 10. Fittings 32, 34 may further include features/elements to ensure a leak-free seal with corresponding fittings 32, 34 (e.g., chamfers, o-rings). The first container 10 and the last container 10 may be connected to a first fluid manifold and a second fluid manifold, respectively. The disclosed fluid manifolds may be associated with tower 200, as will be described in more detail below. Fittings 32, 34 may be configured and dimensioned to self-align containers 10. For example, align containers 10 so as to align the first fitting 32, 34 with the corresponding second fitting 32, 34.

In another non-limiting example, container 10 may include both the first fitting 32, 34 and the corresponding second fitting 32, 34 such that container 10 is configured for connection with two adjacent containers 10. Containers 10 may be connected as described herein to create a "coupled-line" with adjacent containers 10. In some embodiments, the first fitting may be a male fitting 32 and the corresponding second fitting may be a female fitting 34. In other embodiments, the first fitting may be a female fitting 34 and the corresponding second fitting may be a male fitting 32. The disclosed coupled-line having at least two containers 10 may be in communication (e.g., fluid, electrical, thermal) with each other. The disclosed coupled-line may include a plurality of containers 10. For example, the disclosed coupled-line may include up to about 16 containers 10 in communication (e.g., fluid, electrical, thermal) with each other. However, the disclosed coupled-line may include more than 16 containers 10 in communication with each other. Fittings 32, 34 may further include features/elements to ensure a leak-free seal with corresponding fittings 32, 34 (e.g., chamfers, o-rings). The first container 10 and the last container 10 may be connected to a first fluid manifold and a second fluid manifold, respectively. The disclosed fluid manifolds may be associated with a tower, as will be described in more detail below. Fittings 32, 34 may be configured and dimensioned to self-align containers 10. For example, align containers 10 so as to align the first fitting 32, 34 with the corresponding second fitting 32, 34.

A conveyor may be used to push a new container into a first container or a coupled-line of containers on a level of a grow tower. The pushing of containers onto a level of a grow tower by the conveyor can form fluid leak-seals between the next container or a coupled line of containers. Individual containers may be removed from a coupled line by separating a container from an adjacent container. The conveyor can separate coupled containers by pulling the container closest to the conveyor onto the conveyor.

Container 10 may further include optional features/elements for engaging adjacent container(s) 10. In some embodiments, optional features/elements for engaging adjacent container(s) 10 may supplement the above-mentioned irrigation assembly. In other embodiments, optional features/elements for engaging adjacent container(s) 10 may be utilized without the above-mentioned irrigation assembly. In a non-limiting example, optional features/elements for engaging adjacent container(s) 10 may include latch 40 and bumper 42. Latch 40 and bumper 42 may be mounted with respect to surface 38 of sidewall 14. Container 10 may include two latches 40 positioned opposite two bumpers 42 such that container 10 may be connected to adjacent containers to form a "coupled-line", as described above. The first container 10 and the last container 10 may be connected to a first portion of the tower and a second portion of the tower, respectively. Latch 40 and bumper 42 may be removably attached. Latch 40 and bumper 42 may be configured and dimensioned to self-align containers 10. For example, align containers 10 so as to align latch 40 with corresponding bumper 42.

Container 10 may further include features/elements for supporting developing plants that are conducive to their growing within container 10. In a non-limiting example, sidewall 14 may at least partially define ledge 44. Ledge 44 may be positioned in close proximity to the opening of container 10. For example, in close proximity to the top edge of sidewall 14. Ledge 44 may be configured to at least partially accommodate a growth medium (e.g., cloth, fabric), a frame, a vapor barrier (e.g., silicone, plastic) and any combination thereof. The combination or coupling of a frame supporting a growth medium with the sidewall ledge 44 advantageously stiffens one or more sidewalls 14 (e.g., sidewall(s) with ramp 26). Also as illustrated in FIG. 11, ledge 44 may directly or indirectly engage with protruding portion 22 when stacking containers 10 upside down or tilted on or close to a top edge so as to facilitate draining.

Figure 20:
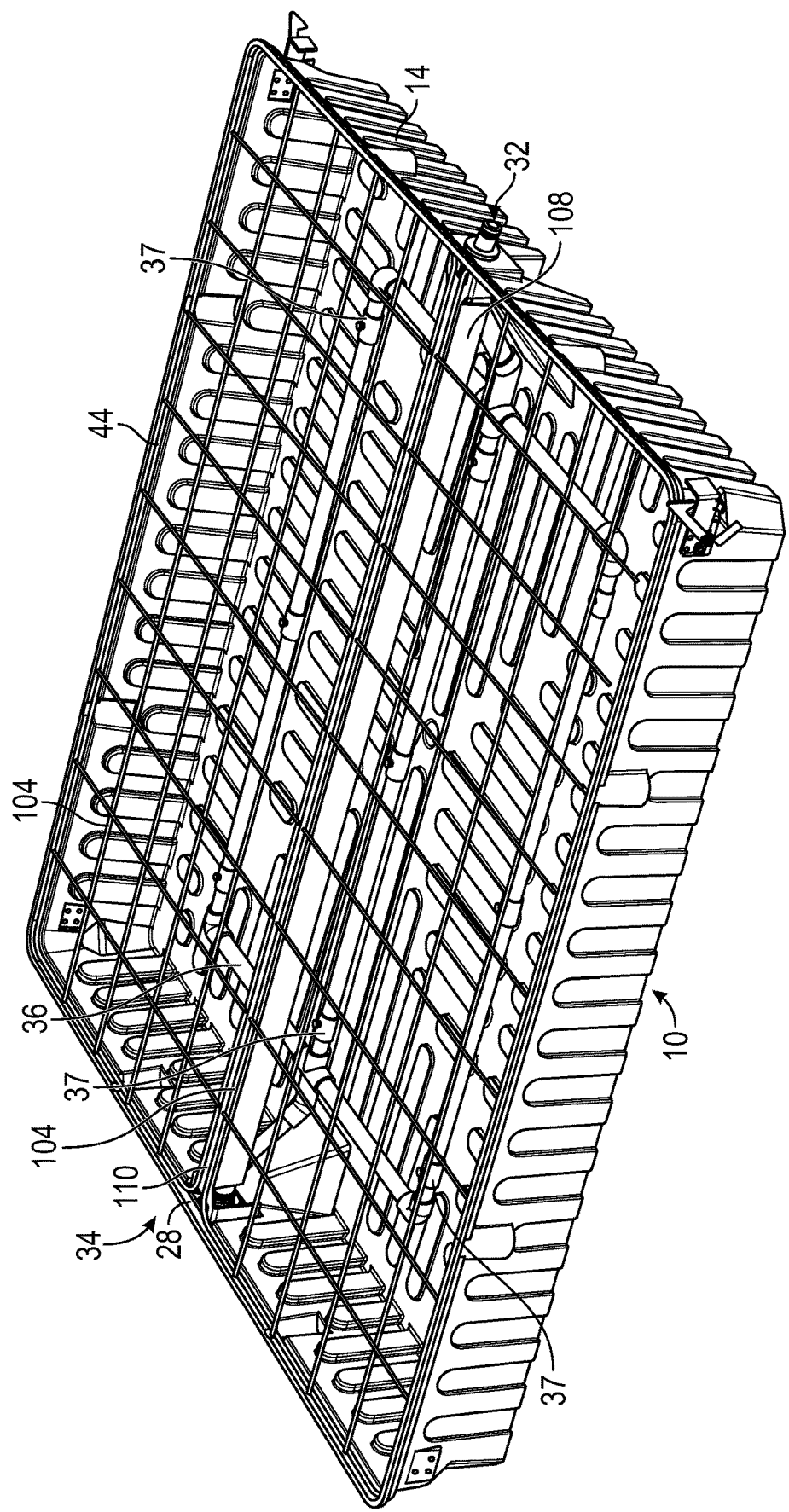
FIG. 20 schematically depicts a view of a container according to the disclosure with frames positioned thereon to support plants.
Figure 21:
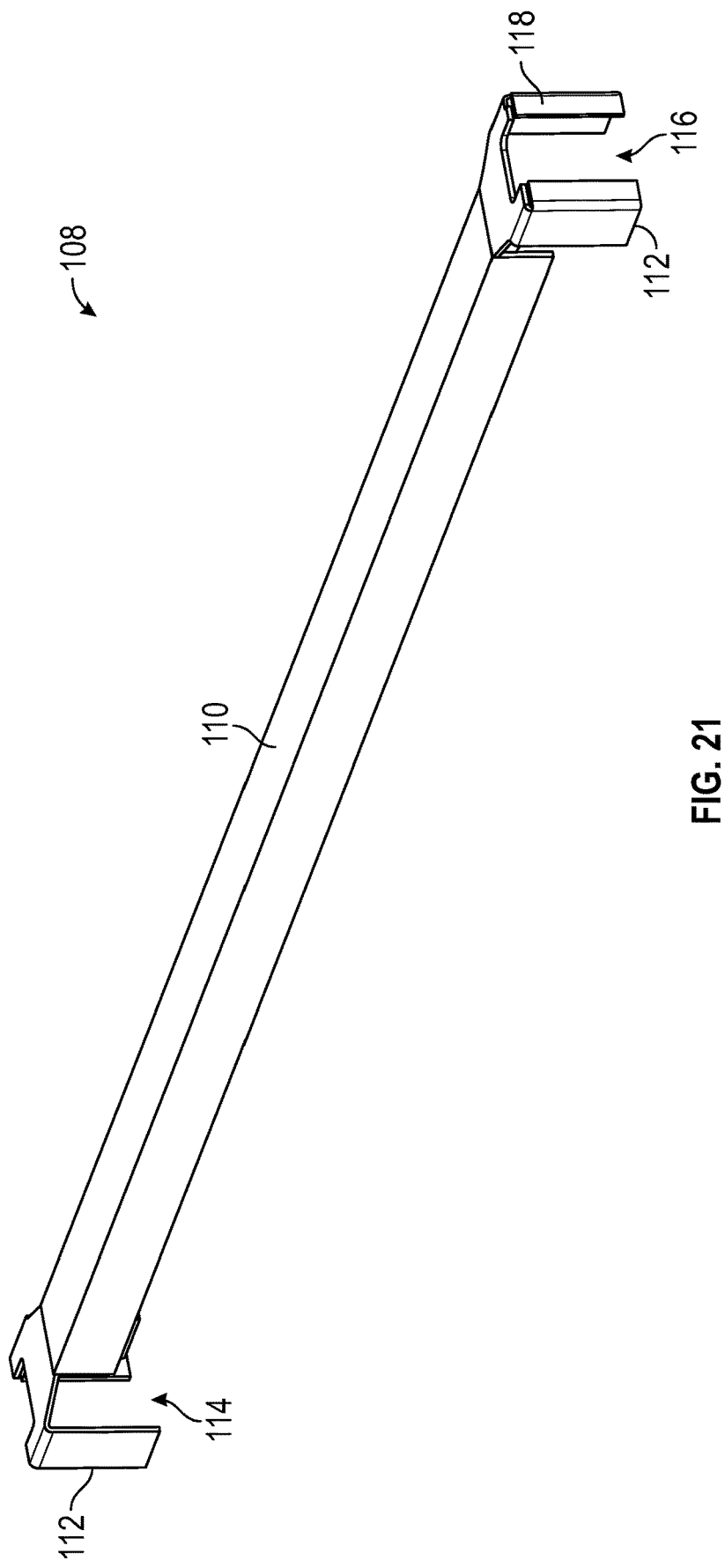
FIG. 21 schematically depicts a container spacer according to the present disclosure.

In some embodiments of the disclosure, two or more frames 104 that can support growth media (not shown) may be positioned within a container 10, adjacent edges of the frames 104 can span one side of the container having fitting 32 to the opposite side of the container having fitting 34. The frames 104 can be positioned above the irrigation lines 36 and nozzles 37. The frames 104 with growth media (not shown) can be positioned on a ledge or edge of the container. Adjacent frame edges spanning between the container sidewalls with fittings 32 and 34 can act as a spacer and can strengthen and/or brace the opposing sidewalls of the container. In some other embodiments of the disclosure, a separate container spacing member 108 or spacer can span opposing sidewalls of the container 10 and can be used to act as a spacer and can strengthen and/or brace the opposing sidewalls of the container 10. The container spacing member 108 can span opposing walls and may support an edge of one or more frames 104 as illustrated in FIG. 20. The container spacing member 108 may have alignment features at its ends to position the spacing member in the container 10. In some embodiments the alignment features can position the spacing member 108 in the partially recessed surface(s) 28 of opposing sidewall 14.

The spacing member 108 can include prongs at the opposite ends of the member. The prongs can be vertically oriented and can position the spacer 108 in the partially recessed surface(s) 28 in the sidewall 14. The spacer 108 positioned in the partially recessed surface(s) 28 of the container 10 can straddle the irrigation line while remaining evenly positioned with respect to the rim of the opening of container 10 as illustrated in FIG. 20. The vertical prongs 112 can fit within partially recessed surface(s) 28, straddle the irrigation line, and can rest on ramp 26 as illustrated in FIG. 20. Side openings 114 and end openings 116 at each end of the spacer 108 can be formed by the prongs 112. The prongs 112 can have flat or rounded surfaces. In some embodiments the front surface portion 118 of the prong can fit between the partially recessed surface 28 on the inside of the container and a flange or slot 33 on the irrigation line assembly and thereby fix the distance between opposing sidewalls of the container and prevent compression and/or elongation of the container. As illustrated in FIG. 20, the frames 104 in the container 10 can be positioned on a top surface 110 spacer 108. This position of the spacer 108 enables harvesting of developed plants from the grow media on the frames 104 with the spacer 108 in place in the container 10. After harvesting, the frames 104 and growth media can be removed from the container ledge 44 and top surface 110 of the spacer 108. The spacer 108 may be removed and the container with the irrigation lines cleaned. The irrigation lines 36 may be drained, and optionally cleaned and dried with a gas flush. The irrigation lines 36 can optionally be removed from the container 10.

Container 10 (and any component thereof) may be fabricated (e.g., formed) from a material that is impervious to one or more of the disclosed fluids and has the desired rigidity to promote stacking/nesting. For example, container 10 may be formed from a plastic. Particularly, container 10 may be formed from one or more of the following plastics, including but not limited to, acrylonitrile butadiene styrene ("ABS"), high molecular weight polyethylene ("HMWPE"), high impact polystyrene ("HIPS") and thermoplastic olefin ("TPO"). Container 10 may be formed using the process of thermoforming, rotomolding, injection molding, 3D printing, lamination, vacuum forming or any additional fabrication processes known in the art. In some embodiments, the interior of container 10 may be formed from a different material from the exterior of container 10. For example, container 10 may be formed from two or more laminated plastics having different characteristics. Thus, the laminated plastic positioned relative to the interior of container 10 may be of a different material than the laminated plastic positioned relative to the exterior of container 10. Container 10 may further include an optional additive that contributes one or more desired performance characteristics. For example, container 10 may be fabricated from a plastic having an optional fireproofing additive.

Container 10 may be configured for use in vertical aeroponic or hydroponic farming. The disclosed vertical farming system may include a tower having one or more pivoting and/or translatable manifolds that provide and remove fluid from the irrigation lines (e.g., a first fluid manifold and a second fluid manifold associated with a tower level) and an elevator/conveyor. Elevator/conveyer may optionally include features/elements to unlatch containers 10, interconnected for example between optional latch 40 and bumper 42, prior to moving container 10 onto a level of the elevator. On the elevator, container 10 may be loaded and optionally tilted opposite the direction of the non-flat surface to prevent dripping of fluid through drainage opening 16 onto developing plants in container 10 positioned below. In another example, the disclosed vertical farming system may be partially (or fully) automated.

Figure 5:
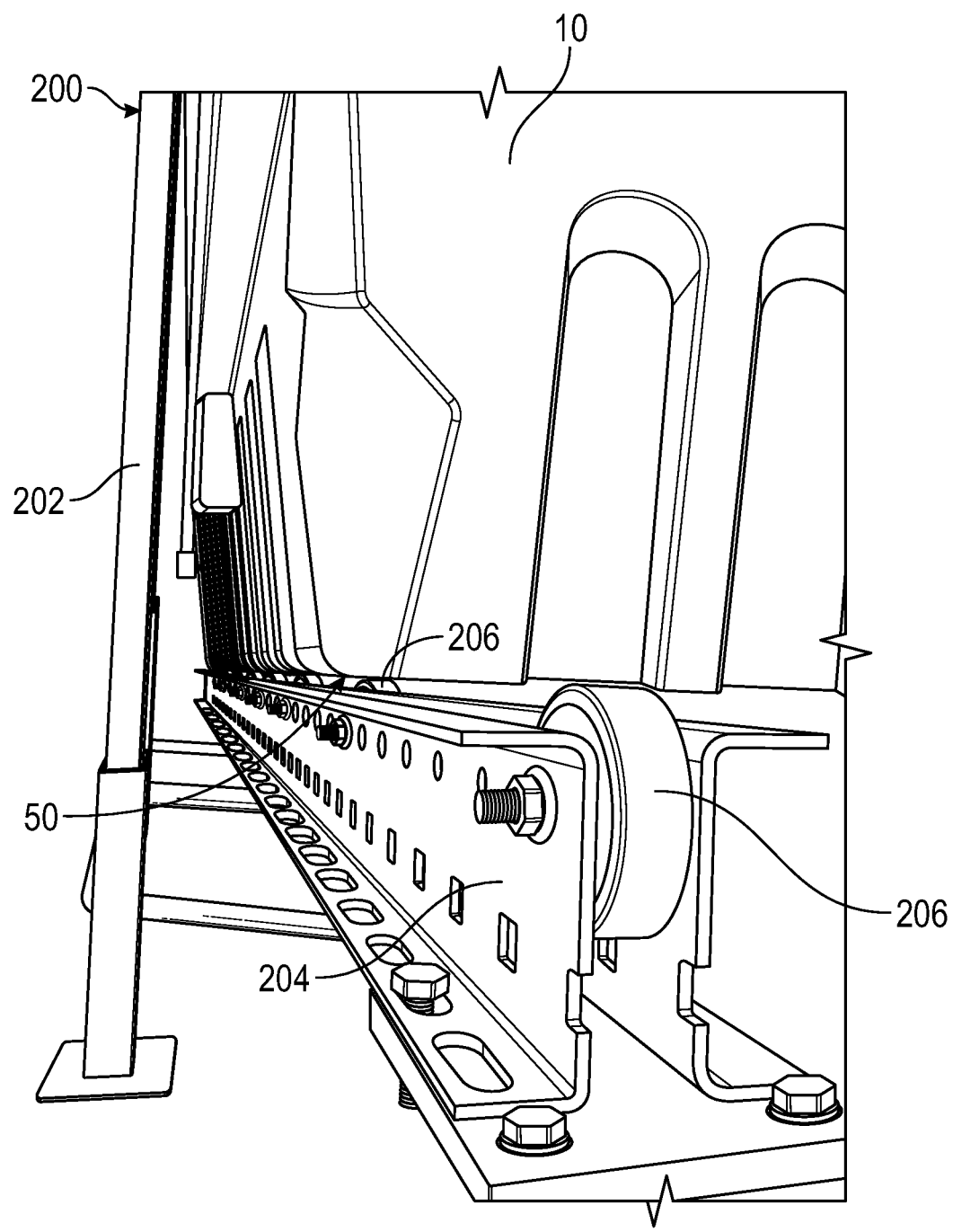
FIG. 5 schematically depicts a perspective view of an advantageous container positioned with respect to a grow tower having one or more rollers, according to the present disclosure.
Figure 18:
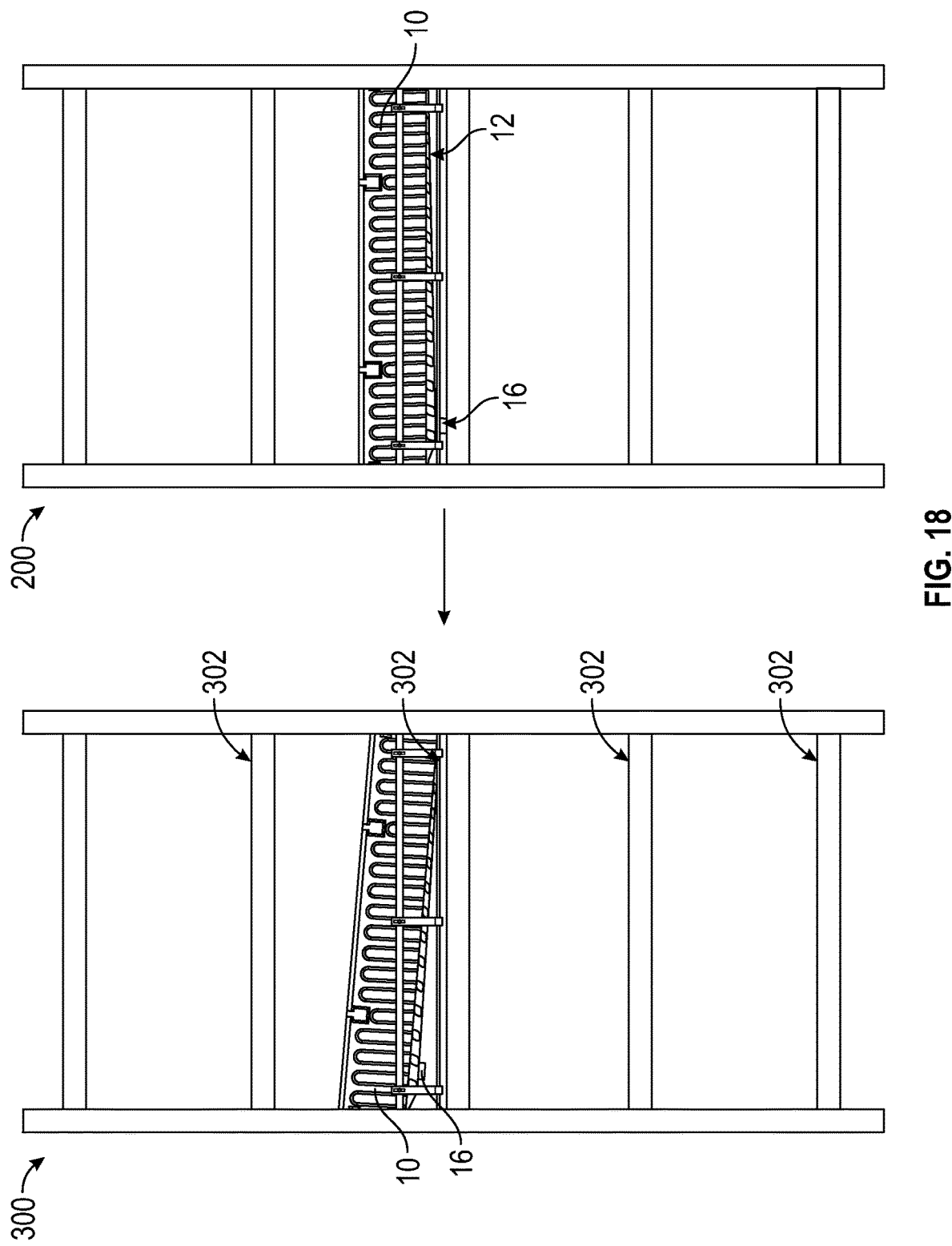
FIG. 18 schematically depicts an advantageous container positioned on a growth tower and another advantageous container positioned in a tilting configuration on an elevator/conveyor.

As depicted in FIGS. 5 and 18, container 10 may be positioned within grow tower 200 having a plurality of vertical support members 202 and rails 204. Tower 200 may further include at least one roller 206 which is positioned in direct/indirect contact with container 10. In some embodiments, tower 200 may include a plurality of rollers 206 in direct/indirect contact with container 10. Rollers 206 may be associated with one or more rails 204. Surface 50 of container 10 may slidably interact with rollers 206 of rails 204 so as to keep the top edges of sidewalls 14 substantially level in the grow chamber. Rollers 206 may freely move or may be powered so as to assist with movement of container 10. In one embodiment, container 10 having two oppositely positioned substantially flat surfaces 50 may interact with corresponding rollers 206 of rails 204. Rails 204 may interface with a plurality of containers 10 positioned in close proximity to each other. Containers 10 may be positioned in a coupled-line configuration. In some embodiments of the disclosure rollers may be positioned on the containers and the rails configured with surfaces on which the rollers can move and translate the containers 10. In still other embodiments neither the container nor rails include rollers. In still other embodiments, the rails may be at an incline or pitch from one end of the tower to the opposite end of the tower. Containers 10 can have a flat bottom with drainage opening 16 or a sloped bottom as illustrated in FIG. 2 with drainage opening 16.

As illustrated in FIG. 18, tower 200 may include a single level or a plurality of levels, wherein a single container 10 or a plurality of containers 10 may be positioned. In some embodiments, a plurality of containers 10 may be positioned in a coupled-line, as described above. Container(s) 10 may be removed from tower 200 by a mechanical, automatic or partially mechanical and partially automatic system. Elevator/conveyer 300 may interface with one or more containers 10 on level 302 so as to move container 10 to another processing area (e.g., harvesting). Elevator/conveyor 300 may transport the assembly of container 10, including the growth medium/frame assembly. In some embodiments, elevator/conveyor 300 may include a single container 10 on a single level 302. Container(s) 10 may be mechanically, automatically or partially mechanically and partially automatically removed from tower 200 and onto level 302 of elevator/conveyor 300. Container 10 may be tilted to ensure fluid does not drip onto a surface below, including developing plants. As illustrated in FIG. 18, container 10 may be tilted when container 10 is at least positioned on level 302. Tilting may be accomplished mechanically, automatically or partially mechanically and partially automatically (e.g., propping a device below container 10, incorporating a ramp into level 302, engaging container 10 for ease of lifting). Tower 200 may be accessible from a first end and optionally a second end. Containers 10 can be loaded and unload in a first in and first out manner or a first in and last out manner where both sides of the tower 200 are accessible. Containers 10 can be loaded and unloaded in a first in and last out manner where only one side of the tower is accessible.

In some embodiments the container(s) of the disclosure having developing plants thereon may be positioned with respect to a harvester after removal from the grow chamber or grow tower. The developing plants may be harvested from a growth medium positioned with the container(s). The growth medium can be supported by a frame, a vapor barrier (e.g., silicone, plastic), a container spacer, or any combination thereof. A container spacer may be used to support the growth medium in the container.

After passing through the harvester, the growth medium can be removed from the harvester and the container(s) with fittings and/or irrigation lines and nozzles cleaned as an assembly. Cleaning the container assemblies with the fittings, irrigation lines and nozzles in place can reduce the cost and downtime associated with disassembling and cleaning portions of the containers and irrigation lines. After cleaning, the containers can be stacked with the fittings, irrigation lines and nozzle in place and further drained.

In some embodiments the growth medium and support can be removed from the container and separately passed through a harvester.

The following clauses define particular aspects and embodiments of the disclosure.

Clause 1. A growing system including, a container that defines a bottom and a sidewall(s), wherein: (i) the bottom and the sidewall(s) define an interior configured to interact with a fluid, (ii) the bottom and the sidewall(s) define an exterior that at least partially defines a perimeter around the interior, and (iii) the bottom defines a surface that is at least partially non-flat, and the at least partially non-flat surface facilitates fluid drainage into a drainage hole, and wherein the container is configured to engage and/or cooperate with at least one adjacent container.

Clause 2. The growing system of clause 1, wherein the container further includes a stacking feature which enables the container to be stacked/nested one upon the other.

Clause 3. The growing system as in any one of clauses 1 or 2, wherein the container further includes a stacking feature, the stacking feature includes a recessed portion and a corresponding protruding portion, wherein the recessed portion is positioned within the interior of the container and the corresponding protruding portion is positioned on the exterior of the container.

Clause 4. The growing system of clause 3, wherein a first container is stacked/nested within a second container, such that the protruding portion of the first container engages with the recessed portion of the second container, wherein the first container is stacked/nested a predetermined distance from the second container.

Clause 5. The growing system as in any one of clauses 3 and 4, wherein the recessed portion further defines a ledge for interaction with the protruding portion so as to position a first container a predetermined distance from a second container when the first container is stacked/nested in contact with the second container.

Clause 6. The growing system as in any one of clauses 1-6, wherein the bottom of the container further defines a plurality of ribs.

Clause 7. The growing system of clause 6, wherein the plurality of ribs direct fluid to one or more fluid guiding interfaces.

Clause 8. The growing system as in any one of clauses 6 and 7, wherein the plurality of ribs direct the fluid towards the drainage hole.

Clause 9. The growing system as in any one of clauses 1-8, wherein the bottom defines the drainage hole and the drainage hole is positioned in close proximity to the sidewall (s).

Clause 10. The growing system as in any one of clauses 1-9, wherein the bottom defines the drainage hole and the drainage hole is positioned in the center of the bottom.

Clause 11. The growing system as in any one of clauses 1-10, wherein the bottom and a sidewall further define a ramp.

Clause 12. The growing system of clause 11, wherein the ramp is at least in part non-planar relative to the base, and wherein such non-planar relationship of the ramp and the base contributes to the rigidity and/or strength of the container.

Clause 13. The growing system as in any one of clauses 11 and 12, wherein the ramp is hollow to facilitate stacking with a second container defining a ramp.

Clause 14. The growing system as in any one of clauses 1-13, wherein the container further includes an irrigation assembly.

Clause 15. The growing system of clause 14, wherein the irrigation assembly includes two fittings, a first fitting being oppositely positioned from a second fitting, wherein the first fitting and the second fitting are configured and dimensioned to interface with the other.

Clause 16. The growing system of clause 15, wherein a first container including the first fitting and a second container including the second fitting are releasably attached to the other by way of the first fitting and the second fitting.

Clause 17. The growing system of clause 16, wherein the first container and the second container are fluidly connected.

Clause 18. The growing system as in any one of clauses 1-17, wherein the irrigation assembly further comprises a nozzle.

Clause 19. The growing system as in any one of clauses 1-18, wherein the container further includes a feature for supporting developing plants.

Clause 20. The growing system of clause 19, wherein the feature for supporting developing plants is configured to receive a growth medium, a frame, a vapor barrier, a spacing member, and any combination thereof.

Clause 21. The growing system as in any one of clauses 1-20, wherein the sidewall(s) are tapered.

Clause 22. The growing system as in any one of clauses 1-21, wherein the bottom further includes opposingly positioned parallel flat surfaces which extend inward to the interior of the container, the flat surfaces interface with one or more non-flat surfaces.

Clause 23. The growing system as in any one of clauses 1-22 further including a ledge extending the sidewall(s) inward to the interior of the container, the ledge is a feature for supporting developing plants.

Clause 24. The growing system as in any one of clauses 1-23, wherein the container is stacked/nested upside down on a second container such that the fluid within the interior of the container drains.

Clause 25. A method of transporting a container within a growing system, including: positioning at least one container within a grow tower, wherein the grow tower includes at least one level and is configured to engage with the at least one container; and moving the at least one container within the grow tower to facilitate receipt by a level of an elevator, wherein the level of the elevator engages with the container and causes the container to tilt relative to a drainage hole defined by the container.

Clause 26. The method of clause 25, wherein the container is mechanically, automatically, or partially mechanically and partially automatically tilted.

Clause 27. The method as in any one of clauses 25 and 26, wherein each level of the elevator is configured to receive one container.

Approximating language, as used herein throughout the specification and claims, may be applied to modify any quantitative or qualitative representation that could permissibly vary without resulting in a change in the basic function to which it is related. Accordingly, a value modified by a term such as "about" or numerical ranges is not to be limited to a specified precise value, and may include values that differ from the specified value. In at least some instances, the approximating language may correspond to the precision of an instrument for measuring the value.

While the disclosure has been described in detail in connection with only a limited number of aspects and embodiments, it should be understood that the disclosure is not limited to such aspects. Rather, the disclosure can be modified to incorporate any number of variations, alterations, substitutions, or equivalent arrangements not heretofore described, but which are commensurate with the scope of the claims. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:
1. A growing system, comprising:
 a container that defines a bottom and a sidewall(s), wherein:
  i. the bottom and the sidewall(s) define an interior configured to interact with a fluid,
  ii. the bottom and the sidewall(s) define an exterior that at least partially defines a perimeter around the interior, and
  iii. the bottom defines a surface with a drainage opening, said drainage opening facilitates fluid drainage from the container, and
 wherein the bottom and a first sidewall of the sidewall(s) include a first ramp formed therein, the first ramp including a first planar top surface extending from the first sidewall and a first angled surface extending from the first planar top surface to the bottom, and the first sidewall includes a first opening extending through the first sidewall adjacent to the first planar top surface of the first ramp;
 wherein the bottom and a second sidewall of the sidewall(s) include a second ramp formed therein, the second ramp including a second planar top surface extending from the second sidewall and a second angled surface extending from the second planar top surface to the bottom, and the second sidewall includes a second opening extending through the second sidewall adjacent to the second planar top surface of the second ramp;
 wherein the first and second ramps are disposed in an opposing facing relationship;

wherein the interior of the container comprises a removable irrigation assembly with a first end of the irrigation assembly extending through the first opening of the first sidewall and a second end of the irrigation assembly extending through the second opening of the second sidewall; and wherein the container is configured to engage and/or cooperate with at least one adjacent container and wherein the container further comprises a stacking feature which enables the container to be nested one upon the other with the removable irrigation assembly positioned within the interior of the respective container.

2. The growing system of claim 1, wherein the stacking feature includes a recessed portion and a corresponding protruding portion, wherein the recessed portion is positioned within the interior of the container and the corresponding protruding portion is positioned on the exterior of the container.

3. The growing system of claim 2, wherein a first container is nested within a second container, such that the protruding portion of the first container engages with a surface of the second container, wherein the first container is nested a predetermined distance from the second container.

4. The growing system of claim 2, wherein the protruding portion further defines a ledge so as to position a first container a predetermined distance from a second container when the first container is nested in contact with the second container.

5. The growing system of claim 1, wherein a plurality of ribs direct the fluid towards the drainage opening.

6. The growing system of claim 1, wherein the bottom defines the drainage opening and the drainage opening is positioned in close proximity to the sidewall(s).

7. The growing system of claim 1, wherein the first and second angled surfaces of the first and second ramps, respectively, are non-planar relative to the bottom, and wherein such non-planar relationship of the ramp and the bottom contributes to the rigidity and/or strength of the container.

8. The growing system of claim 1, wherein the removable irrigation assembly includes one or more irrigation lines extending from the first opening of the first sidewall to the second opening of the second sidewall within the container, and two or more containers are nestable while fittings and/or the one or more irrigation lines remain assembled in the interior of the respective two or more containers.

9. The growing system of claim 8, wherein the removable irrigation assembly includes two fittings, a first male fitting being oppositely positioned from a second female fitting, the first male fitting and the second female fitting are configured and dimensioned to interface with the other and the container is engageable with two adjacent containers in a coupled-line.

10. The growing system of claim 9, wherein a first container comprising the first male fitting and a second container comprising the second female fitting are releasably attached to the other by way of the first male fitting and the second female fitting.

11. The growing system of claim 10, wherein the first container and the second container are fluidly connected.

12. The growing system of claim 1, further comprising a container spacing member spanning opposing sidewalls of the container and braced against opposing inner surfaces of the opposing sidewalls, the container spacing member substantially aligned with a top surface of the container, the first and second ramps, and the first and second openings, said spacing member adapted to receive and support a frame for supporting developing plants.

13. The growing system of claim 1, wherein the container further comprises a feature for supporting developing plants.

14. The growing system of claim 13, wherein the feature for supporting developing plants is configured to receive a growth medium, a frame, a vapor barrier, and any combination thereof.

15. The growing system of claim 14, further comprising a ledge extending the sidewall(s) inward to the interior of the container, the ledge supporting the feature for supporting the developing plants.

16. The growing system of claim 1, wherein the sidewall(s) are tapered.

* * * * *